United States Patent
Brand et al.

(10) Patent No.: US 6,964,534 B2
(45) Date of Patent: Nov. 15, 2005

(54) RETRACTABLE WRITING INSTRUMENT

(75) Inventors: Douglas A. Brand, Easton, PA (US); James C. Matthews, Washington, NJ (US); Christopher P. Orem, Tatamy, PA (US); Charles W. Dietterich, Brodheadsville, PA (US); Patrick J. Traini, Exton, PA (US)

(73) Assignee: Binney & Smith Inc., Easton, PA (US)

( * ) Notice: Subject to any disclaimer, the term of this patent is extended or adjusted under 35 U.S.C. 154(b) by 0 days.

(21) Appl. No.: 10/607,443

(22) Filed: Jun. 26, 2003

(65) Prior Publication Data

US 2004/0265035 A1 Dec. 30, 2004

(51) Int. Cl.⁷ .................................................. B43K 5/16
(52) U.S. Cl. ...................................... 401/108; 401/107
(58) Field of Search .......................... 401/99, 107, 108, 401/116

(56) References Cited

U.S. PATENT DOCUMENTS

| | | | | |
|---|---|---|---|---|
| 1,476,107 A | * | 12/1923 | Rudderham | 401/108 |
| 1,805,348 A | * | 5/1931 | Weingart | 401/108 |
| 1,810,249 A | | 6/1931 | Koehler | |
| 1,940,548 A | | 12/1933 | Jensen | |
| 2,291,859 A | | 8/1942 | Andrews | |
| 2,392,840 A | | 1/1946 | Groft | |
| 2,401,711 A | | 6/1946 | Smith | |
| 2,603,186 A | | 7/1952 | Fischer | |
| 2,626,049 A | | 1/1953 | Tursky | |
| 2,949,887 A | | 8/1960 | Martin et al. | |
| 2,952,242 A | * | 9/1960 | Rosso | 401/108 |
| 3,035,299 A | | 5/1962 | Gordon et al. | |
| 3,124,106 A | | 3/1964 | Kosta | |
| 3,169,511 A | | 2/1965 | Spatz | |
| 3,480,370 A | | 11/1969 | Koeln | |
| 3,594,091 A | | 7/1971 | Bleuer | |

(Continued)

FOREIGN PATENT DOCUMENTS

| | | |
|---|---|---|
| DE | 623816 | 12/1935 |
| DE | 623 816 C | 12/1935 |
| DE | 1259732 | 1/1968 |
| DE | 34 38 074 A1 | 4/1986 |
| DE | 88 05 298 U | 10/1989 |
| EP | 0 267 557 | 5/1988 |
| EP | 0 316 007 A2 | 5/1989 |
| EP | 0 545 917 A | 6/1993 |
| FR | 1424492 | 1/1966 |
| FR | 1 424 492 A | 1/1966 |
| FR | 2 220 353 A | 10/1974 |
| GB | 243110 A | 11/1925 |
| GB | 937 632 A | 9/1963 |
| WO | WO 94/11204 | 5/1994 |
| WO | WO 99/11471 A | 3/1999 |

OTHER PUBLICATIONS

Photographs of Bonnie Bell Flip Gloss, available to applicant in approximately Jul. 2001.

(Continued)

*Primary Examiner*—David J. Walczak
(74) *Attorney, Agent, or Firm*—Leydig, Voit & Mayer, Ltd.

(57) ABSTRACT

A writing utensil configurable between retracted and extended configurations is provided. The writing utensil includes a body having an interior volume and an aperture. A reciprocally movable nib assembly is located in the body and includes a nib that, when in the extended configuration, traverses the aperture. To prevent the nib from drying when in the retracted configuration, a sealing element seals the aperture. In an embodiment, the sealing element is a resilient valve element that can be opened by a sleeve slidably engaging the nib assembly. After the sleeve opens the valve, the sleeve slides with respect to the nib assembly to expose the nib. In another embodiment, the sealing element can be a sliding door that is attached to the nib assembly and overlays the aperture. When the nib assembly is moved to the extended configuration, the sliding door slides in a manner that opens the aperture.

55 Claims, 40 Drawing Sheets

U.S. PATENT DOCUMENTS

| | | |
|---|---|---|
| 3,617,138 A | 11/1971 | Fukui |
| 3,945,734 A | 3/1976 | Woodbridge |
| 4,161,374 A | 7/1979 | Koeln et al. |
| 4,218,154 A | 8/1980 | Erfer |
| 4,269,525 A | 5/1981 | Melikian |
| 4,315,695 A | 2/1982 | Alves dos Santos et al. |
| 4,469,462 A | 9/1984 | Hashimoto et al. |
| 4,560,297 A | 12/1985 | Leem |
| 4,575,271 A | 3/1986 | Hashimoto et al. |
| 4,629,348 A | 12/1986 | Hashimoto et al. |
| 4,759,650 A | 7/1988 | Granoff |
| 4,768,529 A | 9/1988 | Mahruki |
| 4,859,103 A | 8/1989 | Wittek |
| 4,896,983 A | 1/1990 | Im et al. |
| 5,022,773 A | 6/1991 | Waldinger et al. |
| 5,048,990 A | 9/1991 | Hashimoto et al. |
| 5,092,701 A | 3/1992 | Lai |
| 5,420,615 A | 5/1995 | Witz et al. |
| 5,553,956 A | 9/1996 | Mitsuya et al. |
| 5,871,296 A | 2/1999 | Furukawa et al. |
| 5,906,446 A | 5/1999 | McCulloch et al. |
| 5,915,867 A | 6/1999 | Hashimoto |
| 5,927,883 A | 7/1999 | Lebauer |
| 5,967,688 A | 10/1999 | Hu |
| 6,033,141 A | 3/2000 | Blaustein et al. |
| 6,089,776 A | 7/2000 | Kaufmann |
| 6,095,707 A | 8/2000 | Kaufmann |
| 6,135,660 A | 10/2000 | Stevens et al. |
| 6,158,913 A | 12/2000 | Dumler et al. |
| 6,213,661 B1 | 4/2001 | Coon |
| 6,231,257 B1 | 5/2001 | Stevens |
| 6,478,495 B2 | 11/2002 | Ami et al. |
| 6,607,325 B2 | 8/2003 | Hori |
| 2002/0131807 A1 | 9/2002 | Ami et al. |

OTHER PUBLICATIONS

Photographs of unbranded lipstick container, available to applicant in approximately Jul. 2001.

Photographs of Lipolevres Lip Balm Container by La Roche–Posay, France, available to applicant in approximately Jul. 2001.

Photographs of Sanford Colorific Marker available to applicant in approximately Nov. 2002.

Photographs of Avery Marks–A–Lot Hi–Liter Retractable and packaging © 2002.

* cited by examiner

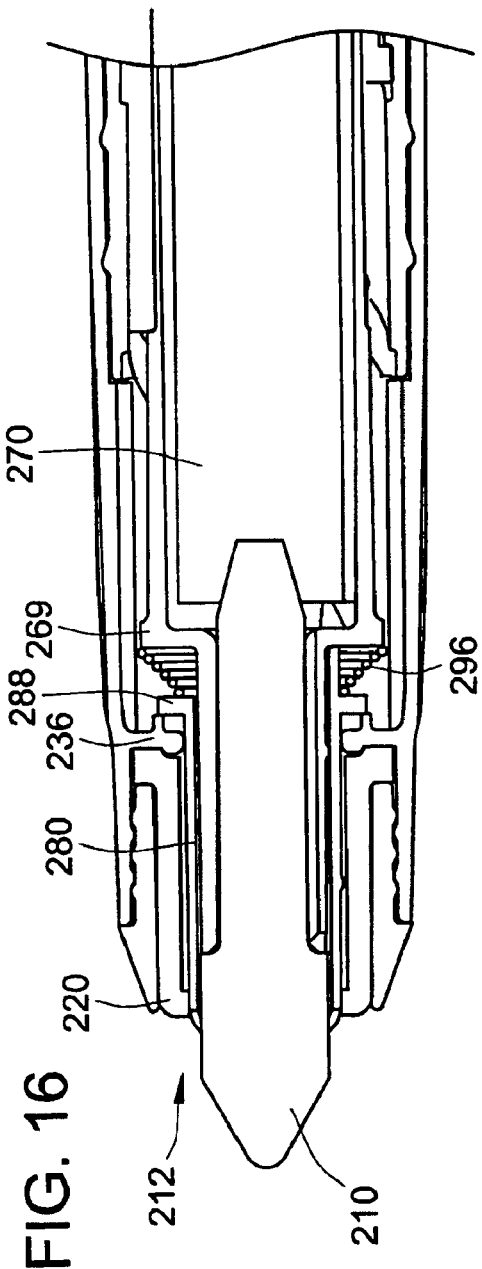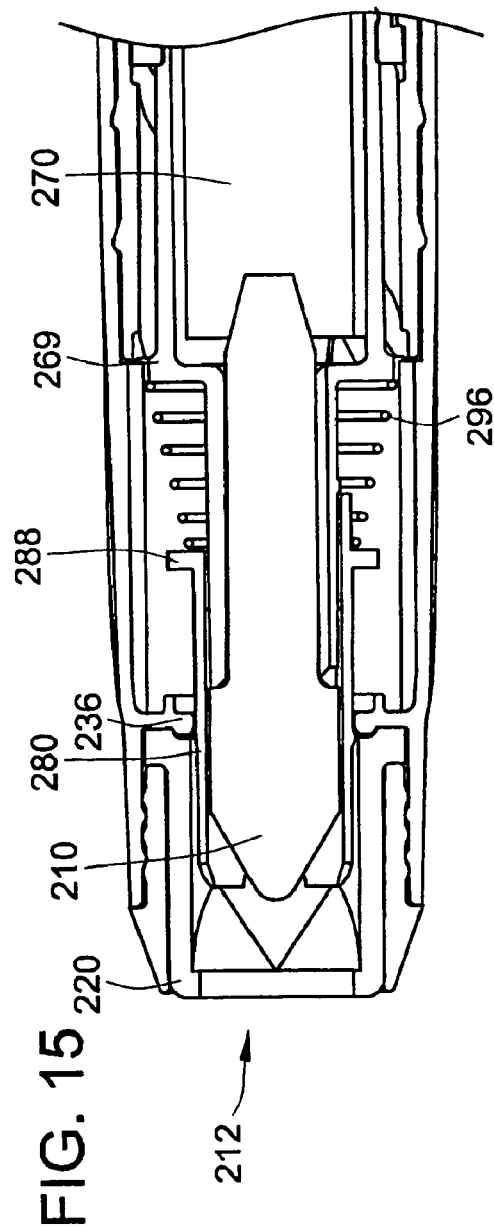

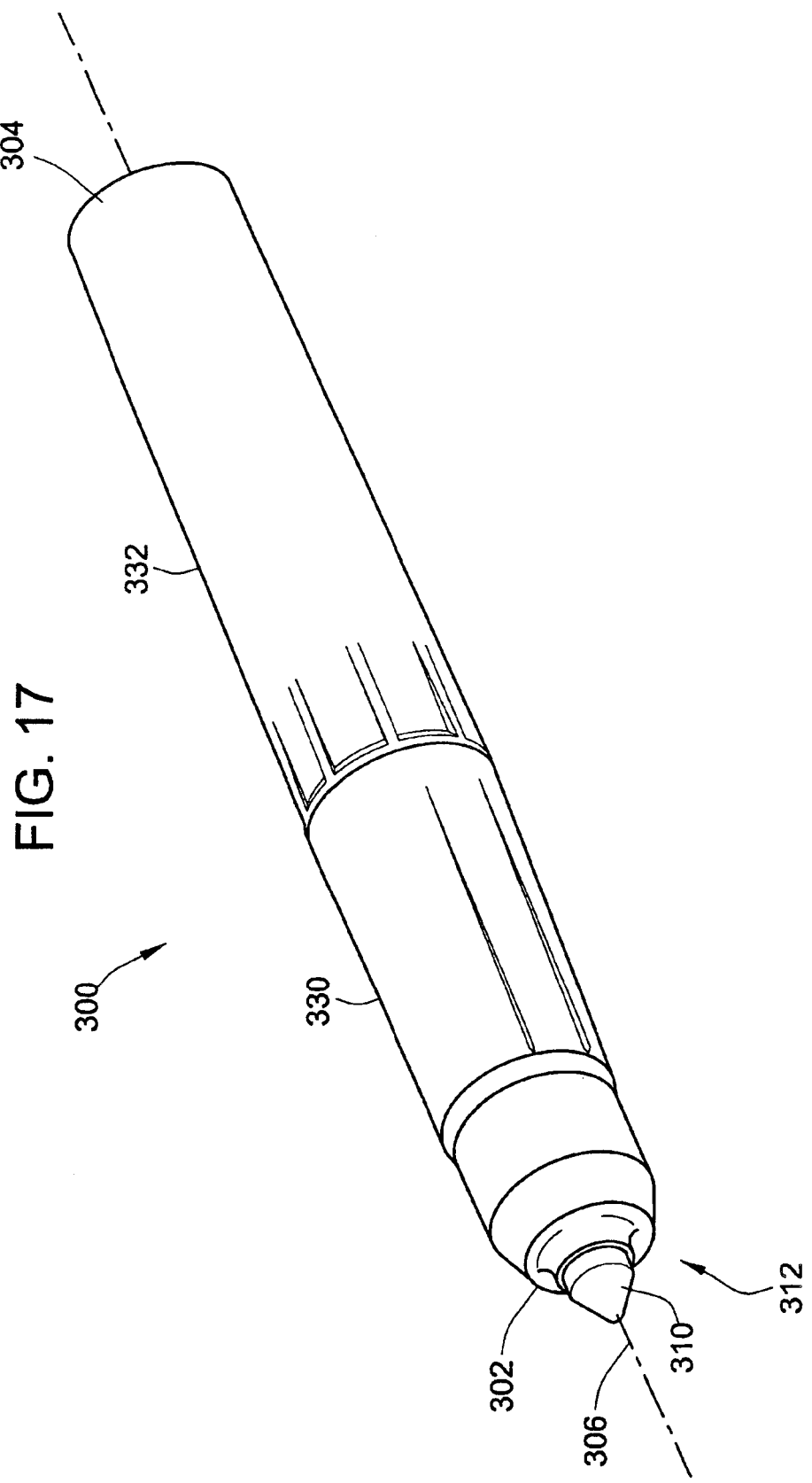

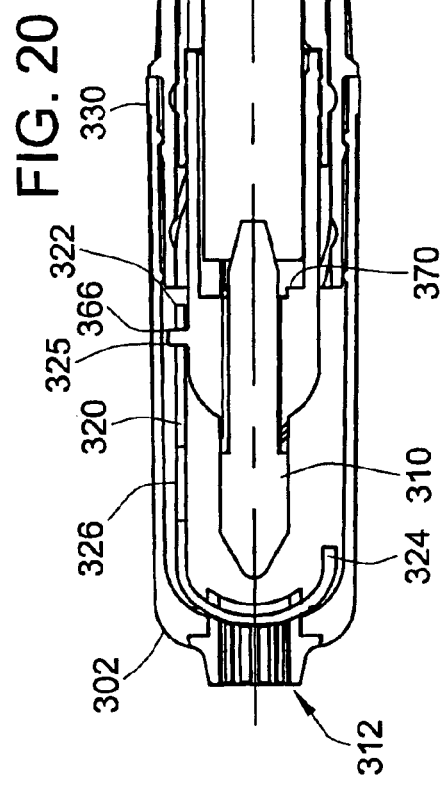
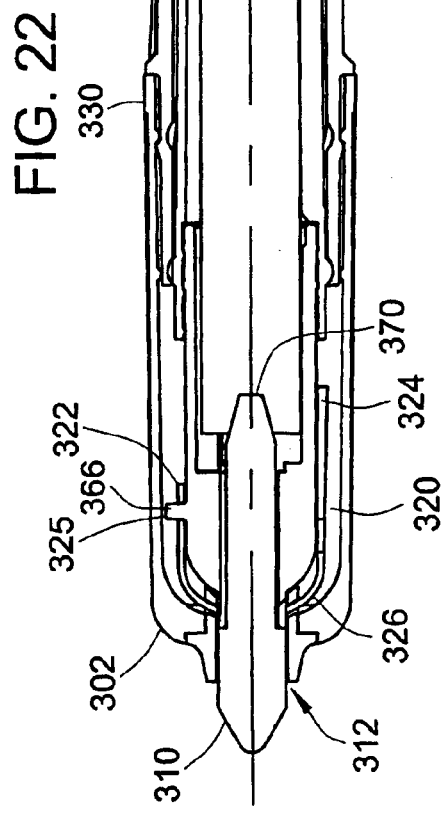

FIG. 37

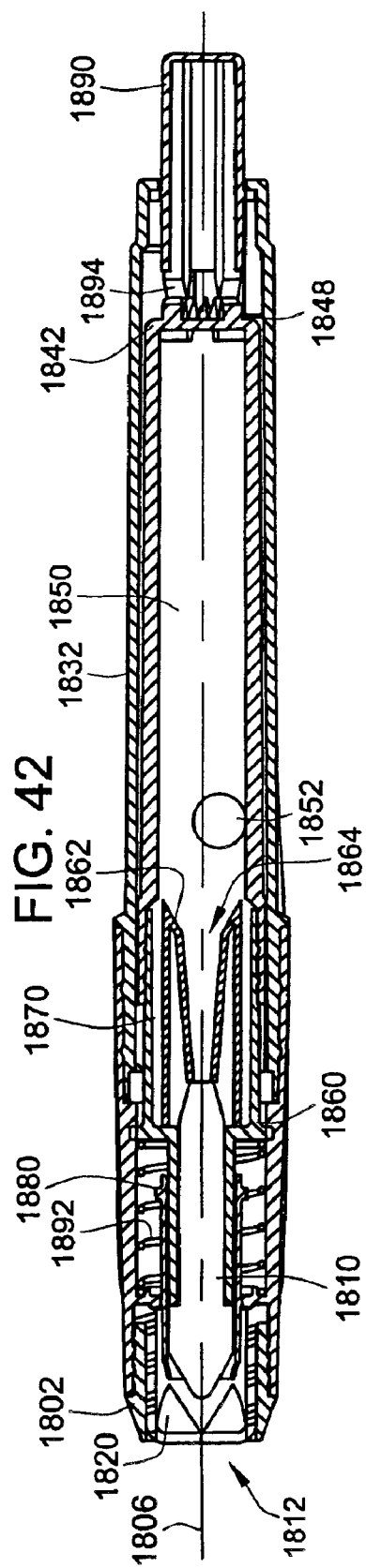

RETRACTABLE WRITING INSTRUMENT

FIELD OF THE INVENTION

The present invention relates generally to writing utensils and more particularly to writing utensils configured so that the writing tip can extend and retract from a body. The present invention finds particular use in field of fluid ink markers.

BACKGROUND OF THE INVENTION

Marker writing utensils are well known in the art. These markers typically include an elongated body from one end of which projects a nib. The elongated body is configured for handling and the nib is configured for transferring ink to a writing surface. More particularly, the nib is typically made of a porous or fibrous material that conducts, or allows for the flow of, fluid ink by capillary action, as is well understood by those of skill in the art. The ink is typically stored within a reservoir located inside of the body to which the nib is in fluid contact with.

The ink is typically made to quickly dry once transferred to the writing surface. A disadvantage of using such inks, though, is that the ink can readily evaporate to the environment causing the marker to dry out. To prevent drying out, the traditional solution was to provide a removable cap that can snap-fit onto the end of the marker and thereby enclose the nib. To write, the cap is simply removed thereby exposing the nib. A problem with the removable cap solution, though, is that the cap can easily be misplaced. As will be appreciated, without a cap, the marker can again readily dry out. Another problem with removable caps is that they may present a choking hazard to infants and small children who are often the intended users of the marker.

Accordingly, there is a need for a retractable marker that is capable of sealingly enclosing the retracted nib.

SUMMARY OF THE INVENTION

The present invention provides a retractable writing utensil designed to overcome the problems experienced with the prior art. In particular, the writing instrument can be marker designed to contain fluid ink and to transfer the ink to a writing surface. The inventive marker includes an outer barrel that functions as the exterior body, an ink reservoir located inside of the outer barrel, and a nib for transferring ink to the writing surface. The marker is configured so that the nib can extend and retract through an aperture located at the front end of the barrel. To prevent the retracted nib from drying when not in use, the marker further includes a sealing element that sealingly encloses the aperture. When extending the nib, the forward movement of the nib engages the sealing element causing the sealing element to provide access to the aperture. To prevent the transfer of ink from the nib to the sealing element, which may disrupt the sealing element's ability to function properly, the nib itself does not directly contact the sealing element to engage it.

In an embodiment, the sealing element is a slit-style, or duckbilled, valve element made of resilient material that can open and close as the nib is extended and retracted. To open valve element, the nib is slidingly received inside a movable sleeve. During the initial stage of extension as the nib moves toward the aperture, the sleeve moves along with the nib to engage the valve element. This engagement causes the slits to open thereby unsealing the aperture. After the valve is opened, the sleeve includes a catch that halts any further forward movement of the sleeve. By sliding through the sleeve though, the nib can continue to move forward and to extend through the aperture.

In another embodiment, the sealing element is a sliding door made of flexible material located inside of the outer barrel. When retracted, the sliding door sealingly overlays the aperture and encloses the nib. The sliding door is also connected to the nib. Accordingly, forward motion of the nib towards the aperture adjusts the sliding door so as to provide access to the aperture. The nib can thereby extend from the marker barrel for writing.

BRIEF DESCRIPTION OF THE DRAWINGS

FIG. 15 is a cross-sectional view of the marker embodied in FIG. 14 in its retracted configuration.

FIG. 16 is a cross-sectional view of the marker embodied in FIG. 14 in its extended configuration.

FIG. 17 is a front perspective view of another embodiment of a retractable marker that includes a sliding door illustrated in the extended configuration.

FIG. 20 is a cross-sectional view of the marker embodied in FIG. 17 but illustrating the marker in its retracted configuration.

FIG. 22 is a cross-sectional view of the marker embodied in FIG. 17 illustrating the marker in its extended configuration.

FIG. 37 is a cross-sectional view of an embodiment of a retractable marker designed to incorporate a free-ink system using divided chambers and illustrated in the retracted configuration with a sliding door enclosing the interior volume.

FIG. 42 is a cross-sectional view of an embodiment of a retractable marker designed to incorporate a free-ink system using a valve system and button for facilitating extension and retraction.

DETAILED DESCRIPTION OF THE EMBODIMENTS

Figure 1:
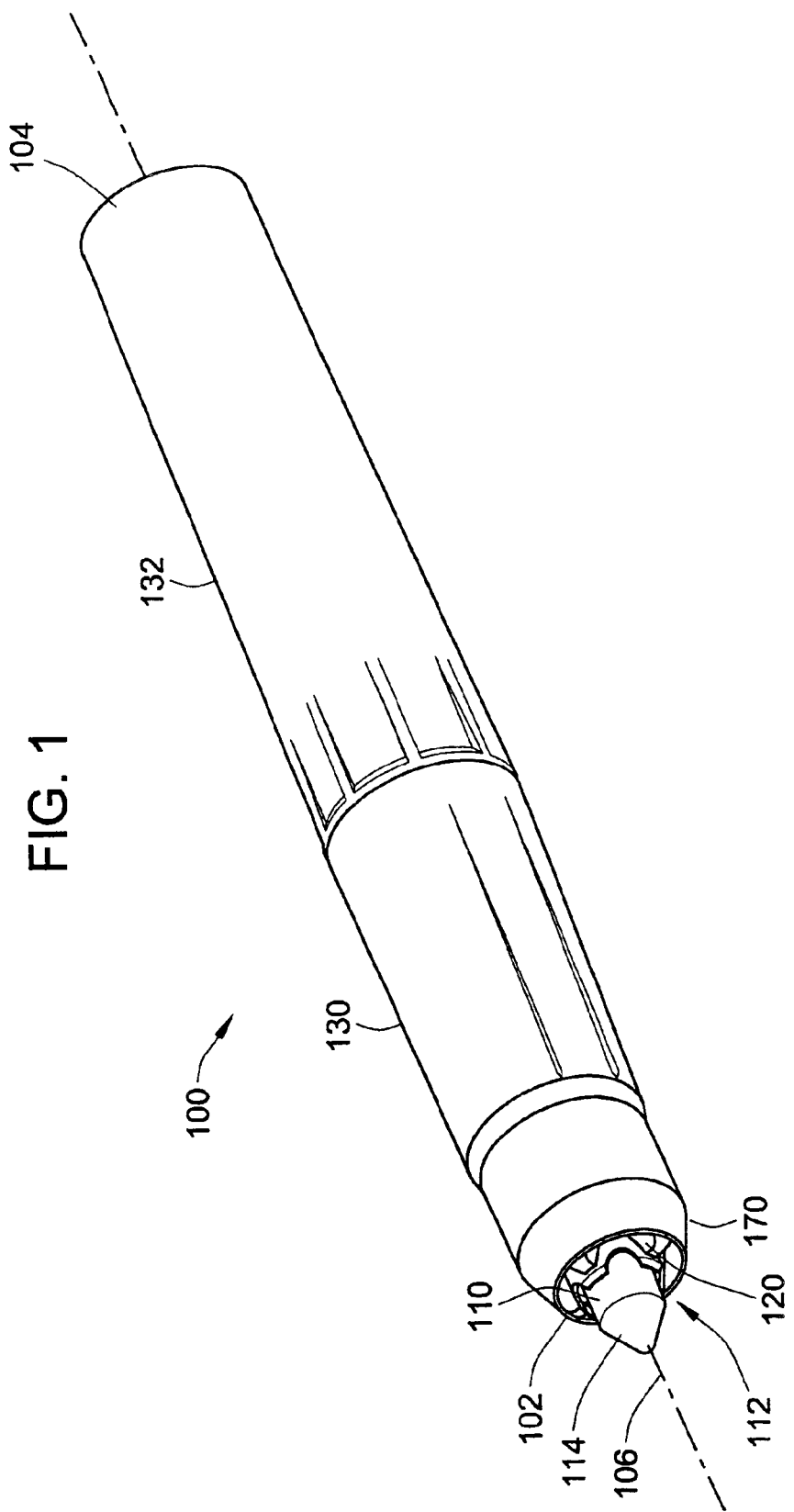
FIG. 1 is a front perspective view of an embodiment of the inventive marker in the extended configuration.
Figure 2:
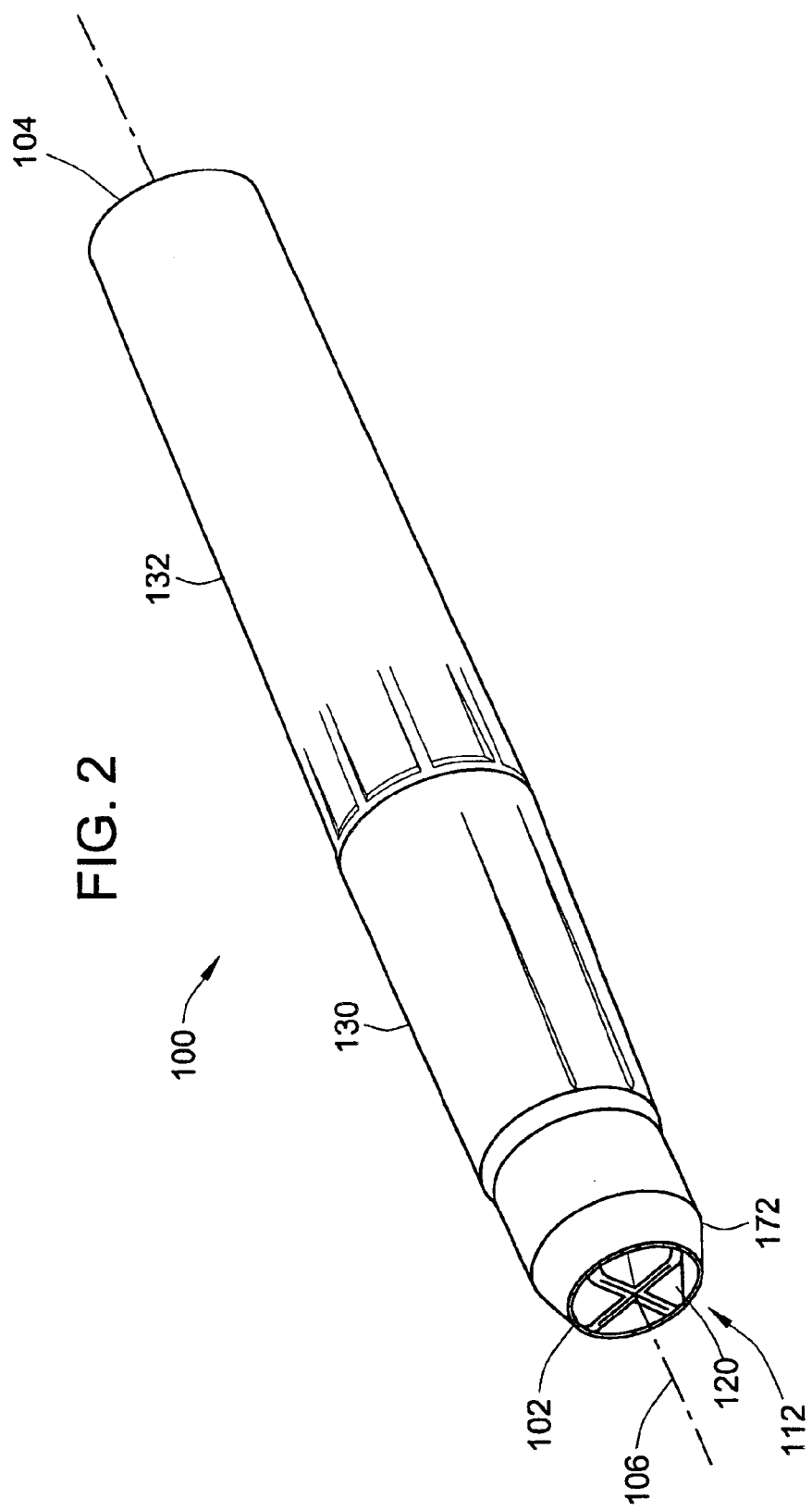
FIG. 2 is a front perspective view of the marker of FIG. 1 in the retracted configuration.

Now referring to the drawings, wherein like numbers refer to like elements, there is illustrated in FIGS. 1 and 2 an embodiment of the marker 100 designed in accordance with the teachings of the present invention. The marker 100 is overall generally shaped as a cylinder having a front end 102 and an opposing rear end 104. The cylindrical shape defines a longitudinal axis 106 that extends between and beyond the front and rear ends 102, 104. As will be appreciated, the terms "front" and "rear" are relative and are in no way intended as a limitation on the present invention, but instead only provide orientation to the marker 100. Furthermore, while the illustrated marker has a generally circular cross-section, other shapes such as oval or octagonal are contemplated.

Referring to FIG. 1, to write with the marker 100, there is extending from the front end 102 a nib 110 that, as will be readily appreciated by those of skill in the art, functions as a writing point for transferring ink to paper or other suitable writing surface. The extended nib 110 projects through an aperture 112 formed into the front end 102. Accordingly, the marker 100 as illustrated in FIG. 1 is in its extended configuration. The illustrated nib 110 includes a conically shaped tip 114 that tapers to a point and is concentrically aligned about the axis 106. In other embodiments, however, the tip 114 may have other shapes.

Referring to FIG. 2, to prevent the marker 100 from drying out when no longer in use, the nib 110 can be retracted through the front end 102 inside of the marker. Accordingly, the marker as illustrated in FIG. 2 is in its retracted configuration and thereby distinguished from the extended configuration illustrated in FIG. 1. To cause the nib to extend and retract, the marker is configured to linearly move the nib along the axis 106. In accordance with the teachings of the present invention, to seal the retracted nib from the environment and further prevent drying of the marker, the front end 102 can enclose itself when the marker is in its retracted position.

In the embodiments illustrated in FIGS. 1 and 2, to enable the front end to enclose, the marker 100 includes proximate to the front end 102 a sealing element. In the illustrated embodiment, the sealing element can be a valve element 120, for example, a duckbill valve. As the nib 110 is linearly moved forward along the axis 106 to its extended configuration, the valve element 120 unseals to provide access to the aperture 112. Likewise, when the nib 110 is moved rearward to its retracted configuration, the valve element 120 reseals the aperture 112.

Figure 3:
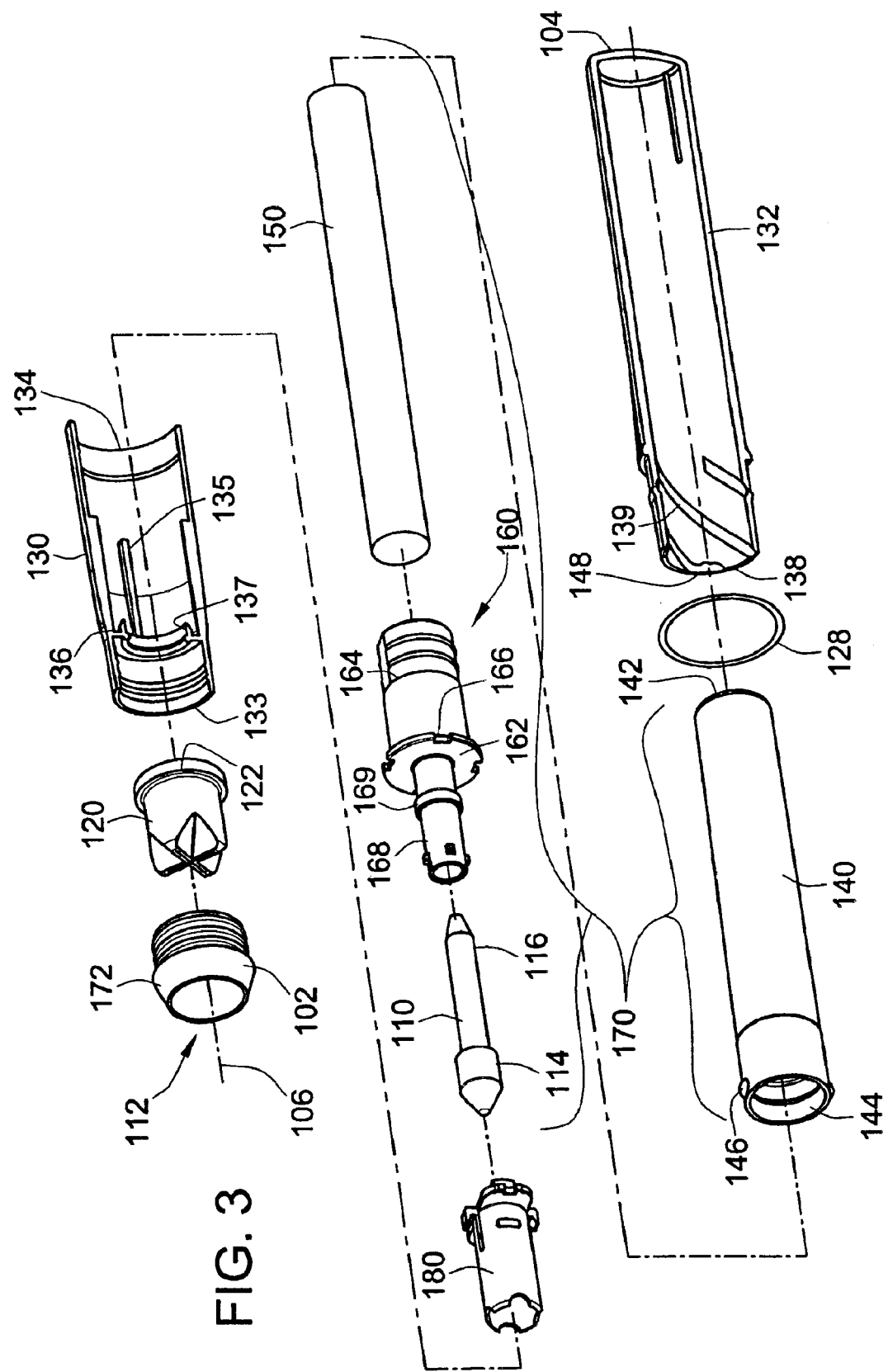
FIG. 3 is an exploded view illustrating the components of marker of FIG. 1.

The components that enable motion of the nib and unsealing of the valve element are better illustrated in FIG. 3. These components include a front barrel 130 and a rear barrel 132. The front and rear barrels 130, 132 in part make up the exterior body of the marker 100 and provide an interior volume. The front and rear barrels 130, 132 are cylindrical tubes that can be made of injection molded plastic. The front barrel 130 includes a first and second opposing opened ends 133, 134. Formed as part of the rear barrel 132 is the rear end 104 that encloses the tubular structure. The opposing end 138, which corresponds to the forward-most part of the rear barrel 132, is opened to provide access to the interior of the rear barrel. As illustrated in FIGS. 1 and 2, when assembled, the front and rear barrels 130, 132 are aligned about the axis 106 and abut against each to provide a seamless, aesthetic appearance. Referring back to FIG. 3, in an embodiment, to ensure that the interior volume of the marker is adequately sealed, an o-ring 128 can be placed between the front and rear barrels 130, 132.

There is also included as part of the marker an inner barrel 140 that is similarly formed as a tubular structure and includes a closed first end 142 and an opened second end 144. Like the front and rear barrels 130, 132, the inner barrel can be made from injection molded plastic. So that the inner barrel 140 can be received inside the front and rear barrels 130, 132, the cross-section of the inner barrel is smaller than the front and rear barrels.

To store the fluid ink provided with the marker 100, a reservoir is included. In the present embodiment, the reservoir is formed from a porous or fibrous material shaped as an elongated cylinder 150 that retains and allows for the flow of the fluid ink through capillaries formed in the reservoir material. In other embodiments, however, the reservoir may be formed of different materials. Moreover, in other embodiments, the marker may be designed as a free ink marker wherein the reservoir is a volume in which the fluid ink is contained. The reservoir volume can be formed as part of a replaceable cartridge that allows for replenishing the ink supply.

In the present embodiment, the reservoir cylinder 150 is received inside the inner barrel 140. To enclose the reservoir cylinder 150 inside the inner barrel 140, the marker also includes a coupling element 160. The coupling element can be made from any suitable material, preferably injection molded plastic. The coupling element 160 has a circular flange 162 from which projects in the rearward direction a cylindrical plug 164. The plug 164 can be press-fit into the second end 144 of the inner barrel 140.

To allow the nib 110 to communicate with the reservoir cylinder 150, there is projecting forward from the circular flange 162 a nib holder 168 that, in the present embodiment, is formed as circular tube. Additionally, the nib 110 includes a rear portion 116 extending rearward from the conical tip 114 that can also be made from the same porous or fibrous material as the reservoir cylinder. The rear portion 116 is received in the tubular nib holder 168 and extends rearward to contact the enclosed reservoir cylinder 150. Accordingly, the nib 110, coupling element 160, reservoir cylinder 150, and inner barrel 144 form a nib assembly 170.

To accommodate the valve element 120 proximate to the front end 102 of the marker 100, the valve element is inserted into the first end 133 of the front barrel 130. To position the valve element 120, the valve element includes a circular rim 122 formed at its base that can abut an inward projecting ledge 136 formed on the inner surface of the front barrel 130. To secure the valve element 120 within the front barrel 130, a muzzle 172 can be press-fit into the first end 134 to compress the rim 122 against the ledge 136. The muzzle 172 includes an inner chamber in which a substantial portion of the valve element is housed and an opening that corresponds to the aperture 112. As illustrated in FIGS. 1 and 2, the exterior of the muzzle 172 preferably is integrated seamlessly with the front barrel 130 and the rest of the marker 100 to produce an aesthetic appearance.

Figure 4:
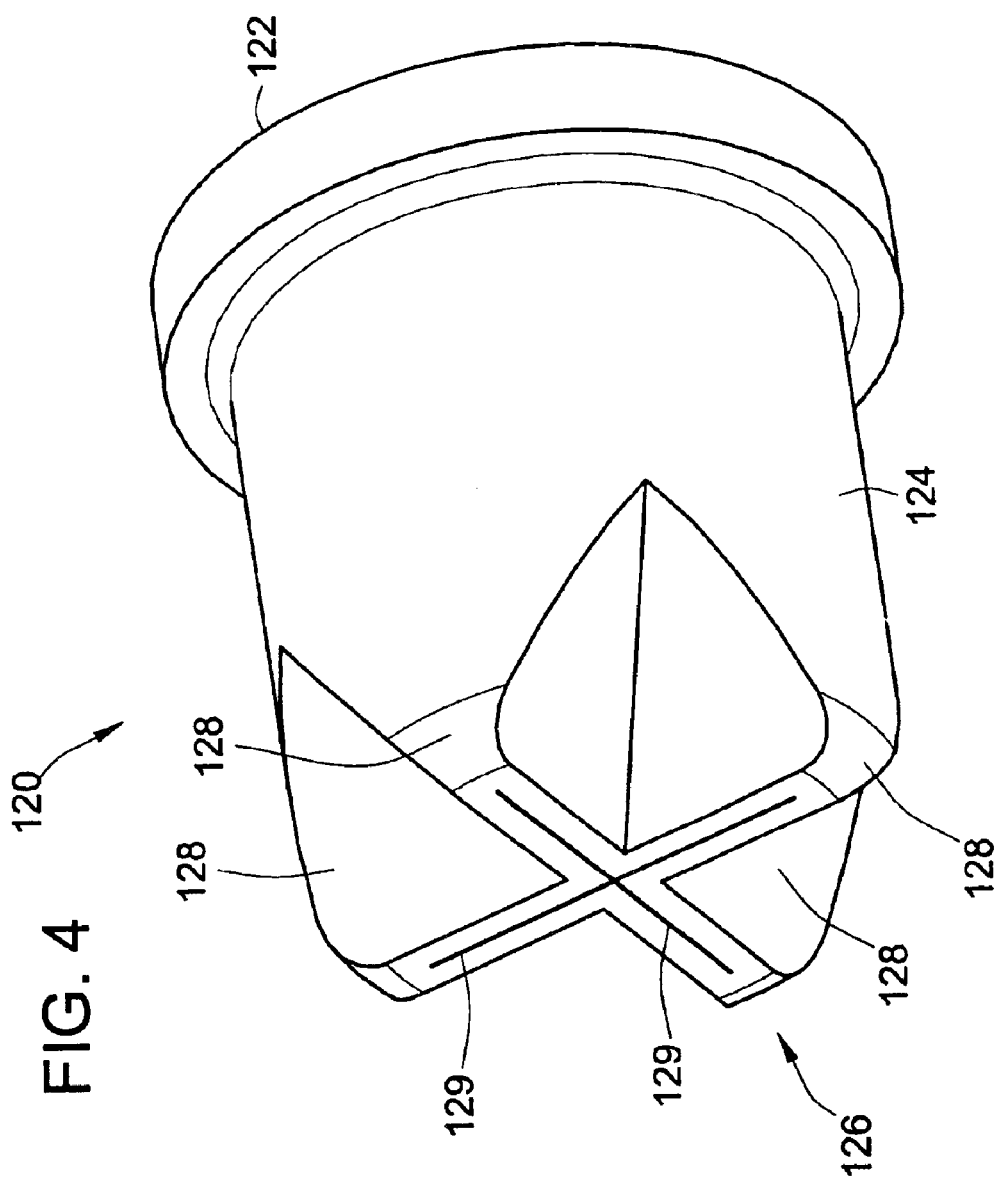
FIG. 4 is a perspective view of a resilient, duckbill valve element.

As better illustrated in FIG. 4, the valve element 120 can be designed as a duckbill valve. The duckbill valve element 120 includes a hollow, circular neck 124 extending from the aforementioned rim 122 that terminates in a front face 126. The valve element is made from a resilient material such as natural or synthetic rubber, and preferably from silicon rubber. The capability of the valve to open and close is provided by a plurality of corner flaps 128 extending from the neck 124 and forming the front face 126. Preferably, four corner flaps 128 are provided. Because of the resilient nature of the valve element material, the four corner flaps can pivot with respect to the neck. When closed, the four corner flaps 128 sealingly adjoin each other to form two perpendicular slits 129. When opened, the four corner flaps 128 pivot apart from each other to unseal the slits 129.

Figure 5:
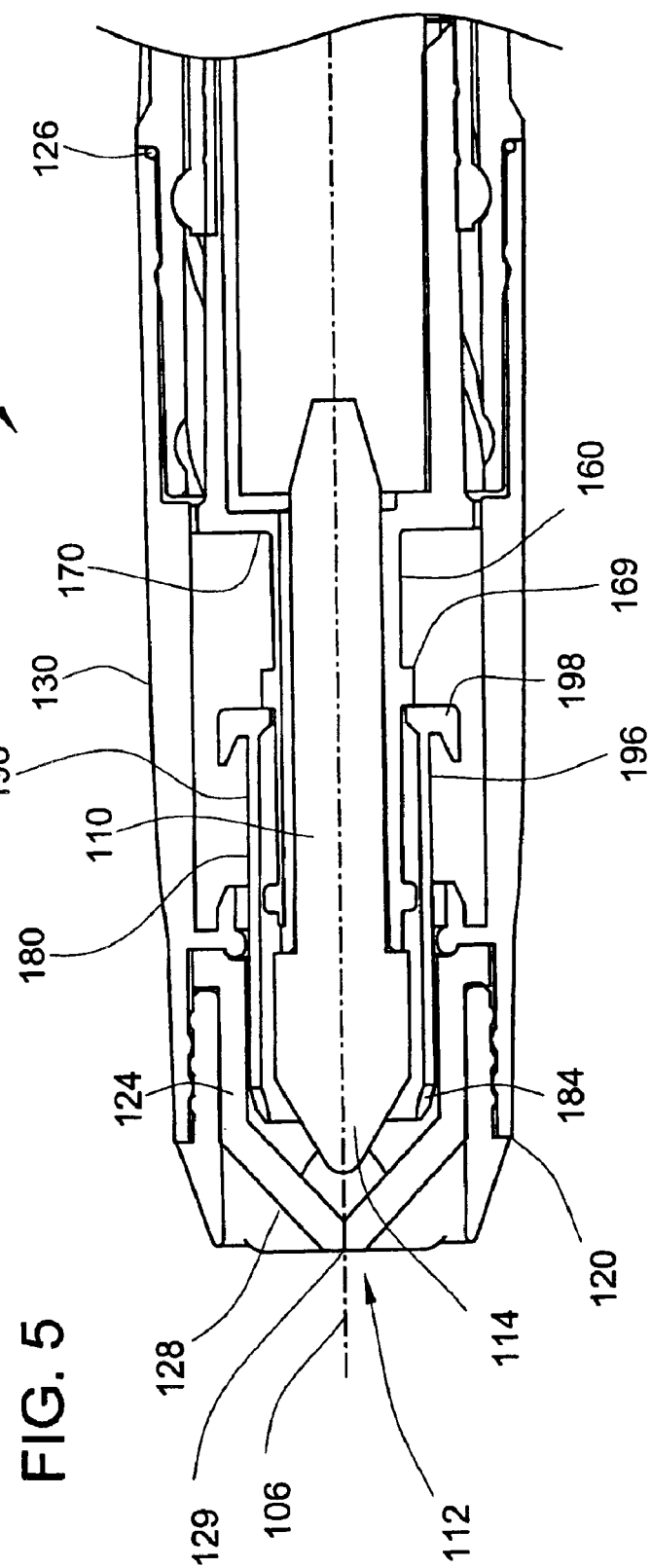
FIG. 5 is a cross-sectional view of the marker of FIG. 1 illustrating the assembled marker in its retracted configuration.
Figure 6:
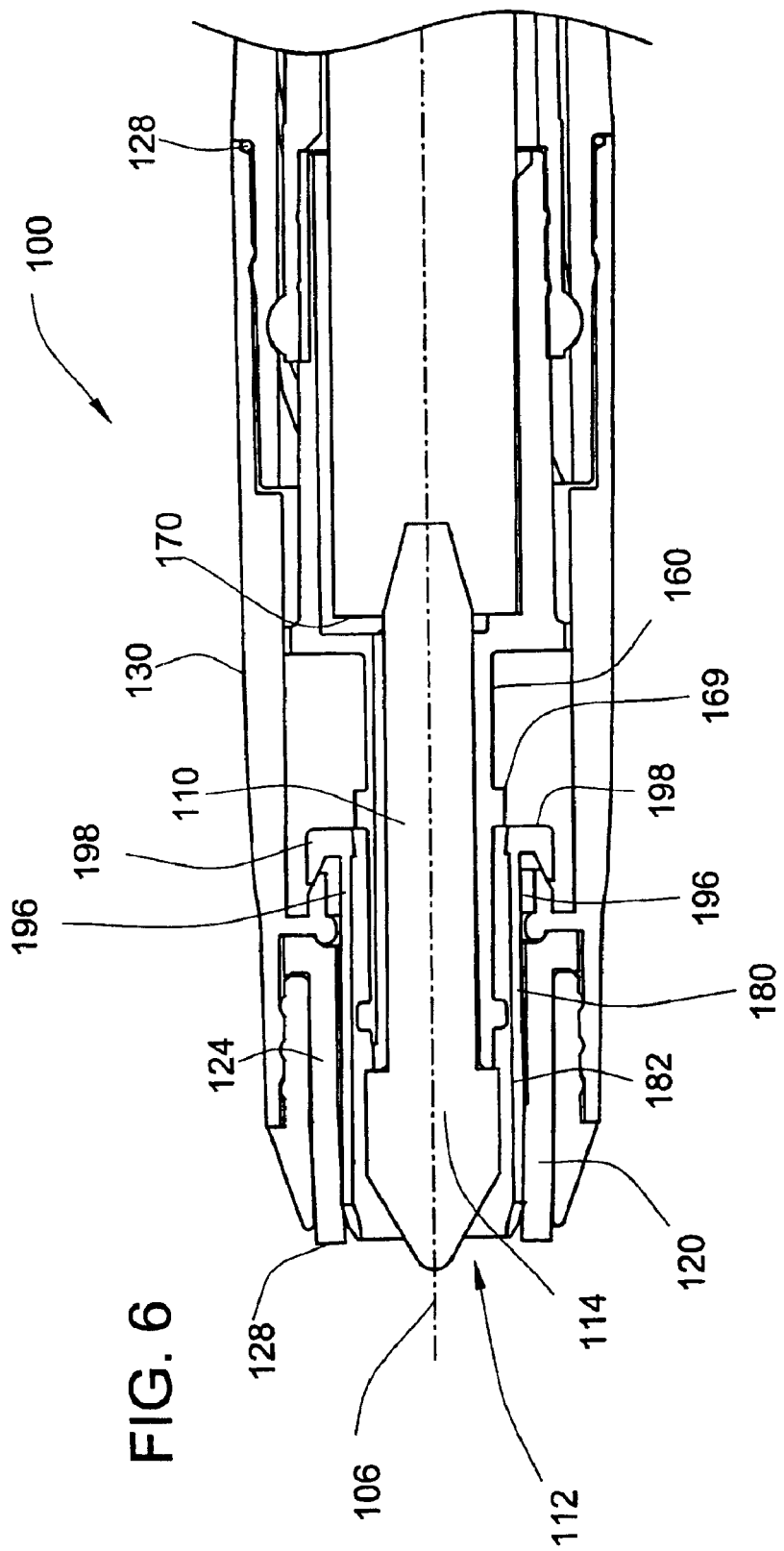
FIG. 6 is a cross-sectional view of the marker of FIG. 2 illustrating the marker as the sleeve engages the valve element.
Figure 7:
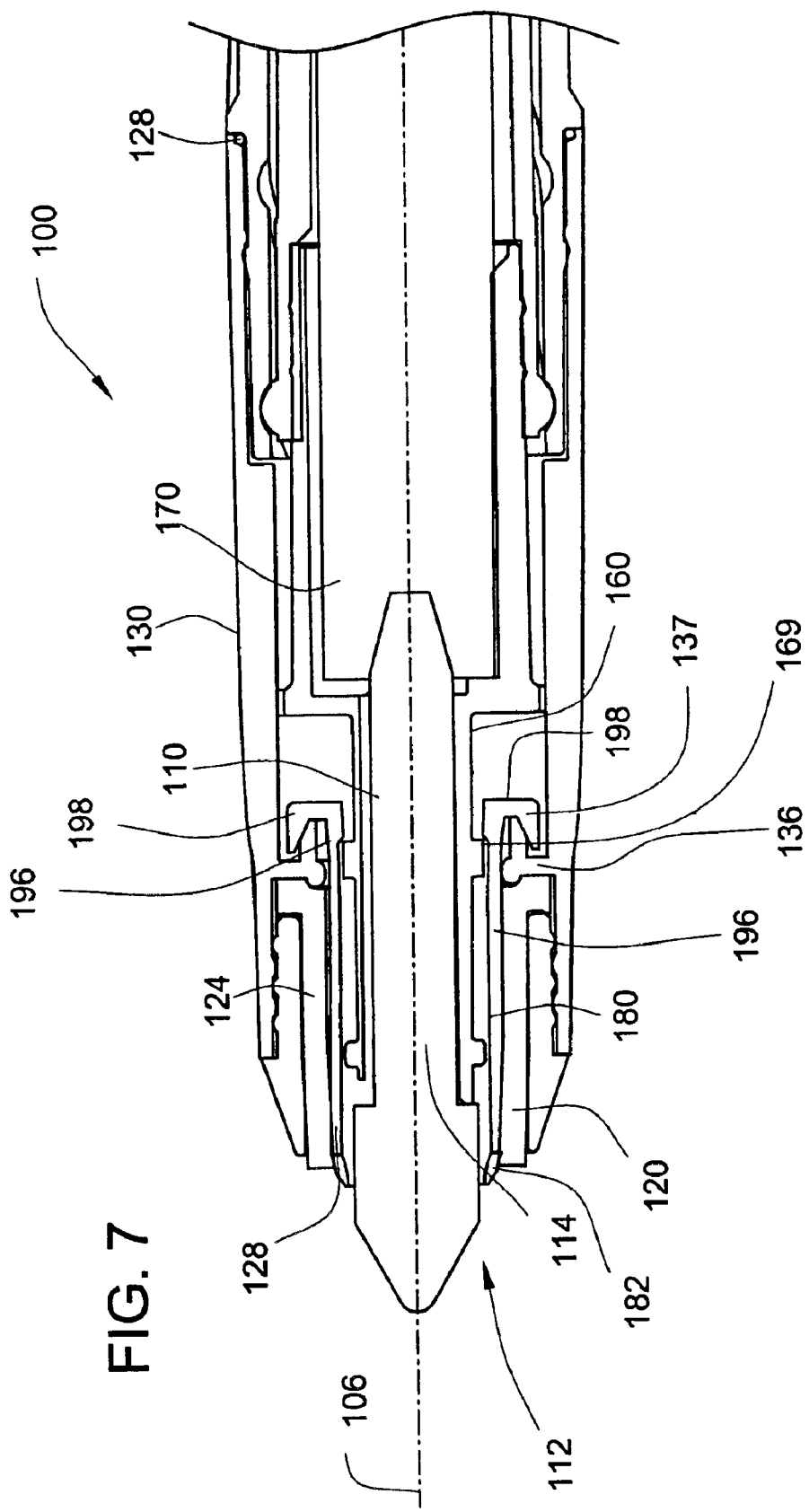
FIG. 7 is a cross-sectional view of the marker of FIG. 2 illustrating the marker in its extended configuration.

As illustrated in FIG. 5, the corner flaps 128 extend from the neck 124 towards the slits 129 at inclined angles. Referring to FIG. 6, as the nib assembly 170 is linearly moved forward along the axis 106, the four corner flaps 128 are pushed apart by pivoting back with respect to the neck 124. Accordingly, the nib 110 can traverse the aperture 112 to its extended configuration for writing as illustrated in FIG. 7. As will be appreciated from FIG. 6, when the nib 110 is retracted back into the marker 100, the resilient nature of the valve material causes the corner flaps 128 to pivot back to close the aperture 112. Additionally, as will be appreciated from FIG. 5 the neck 124 is intimately surrounded by the muzzle 172. As such, the muzzle can provide a compressive force to the neck 124 that tends to cause the four corner members 128 to pivot back adjacent to each other.

Preferably, when the retractable marker is initially produced, the corner flaps are sealed together at the slits by a 0.005 inch web. The web further increases the sealing ability of the valve element allowing for a longer shelf life during distribution of the marker. Accordingly, the first use of the marker by the customer will require piercing of the web by linear extension of the nib assembly.

Figure 8:
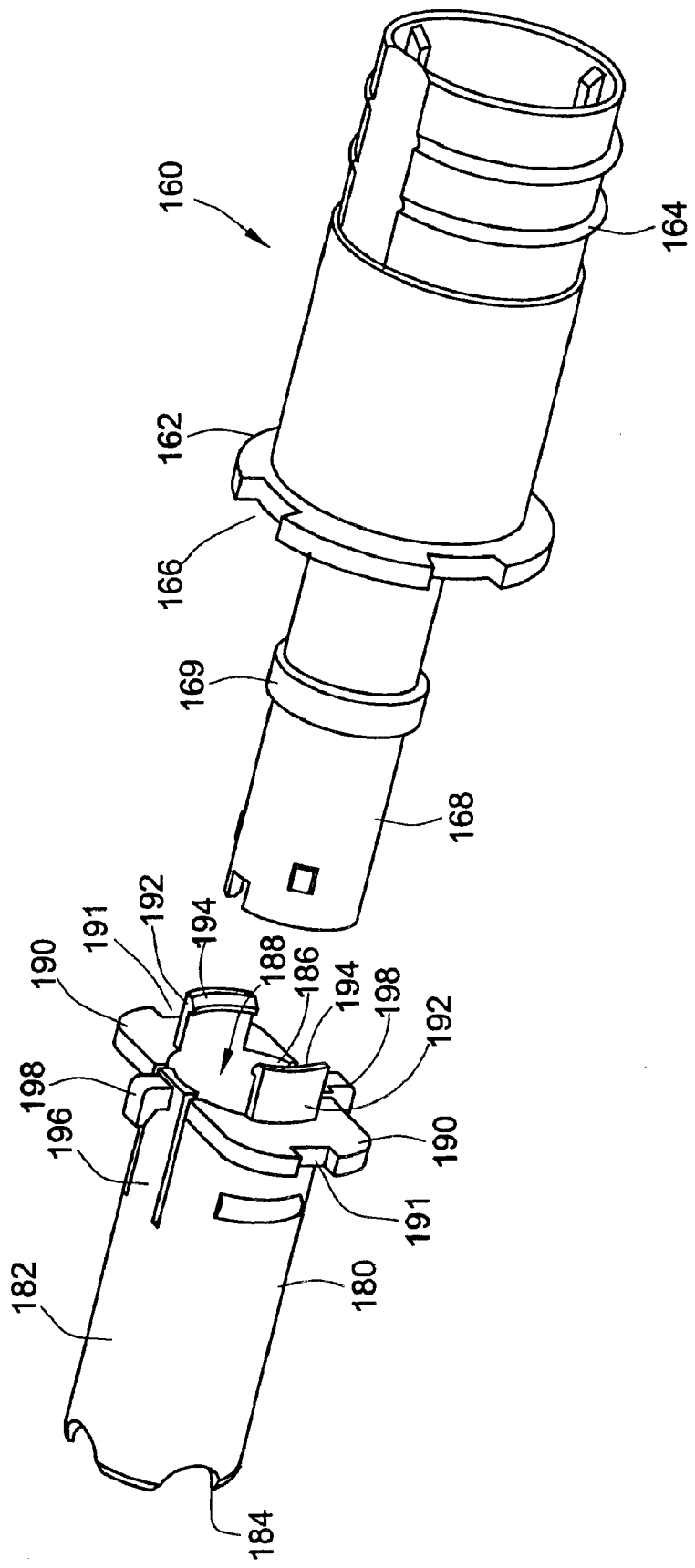
FIG. 8 is a rear perspective view illustrating the sleeve and the coupling element.
Figure 9:
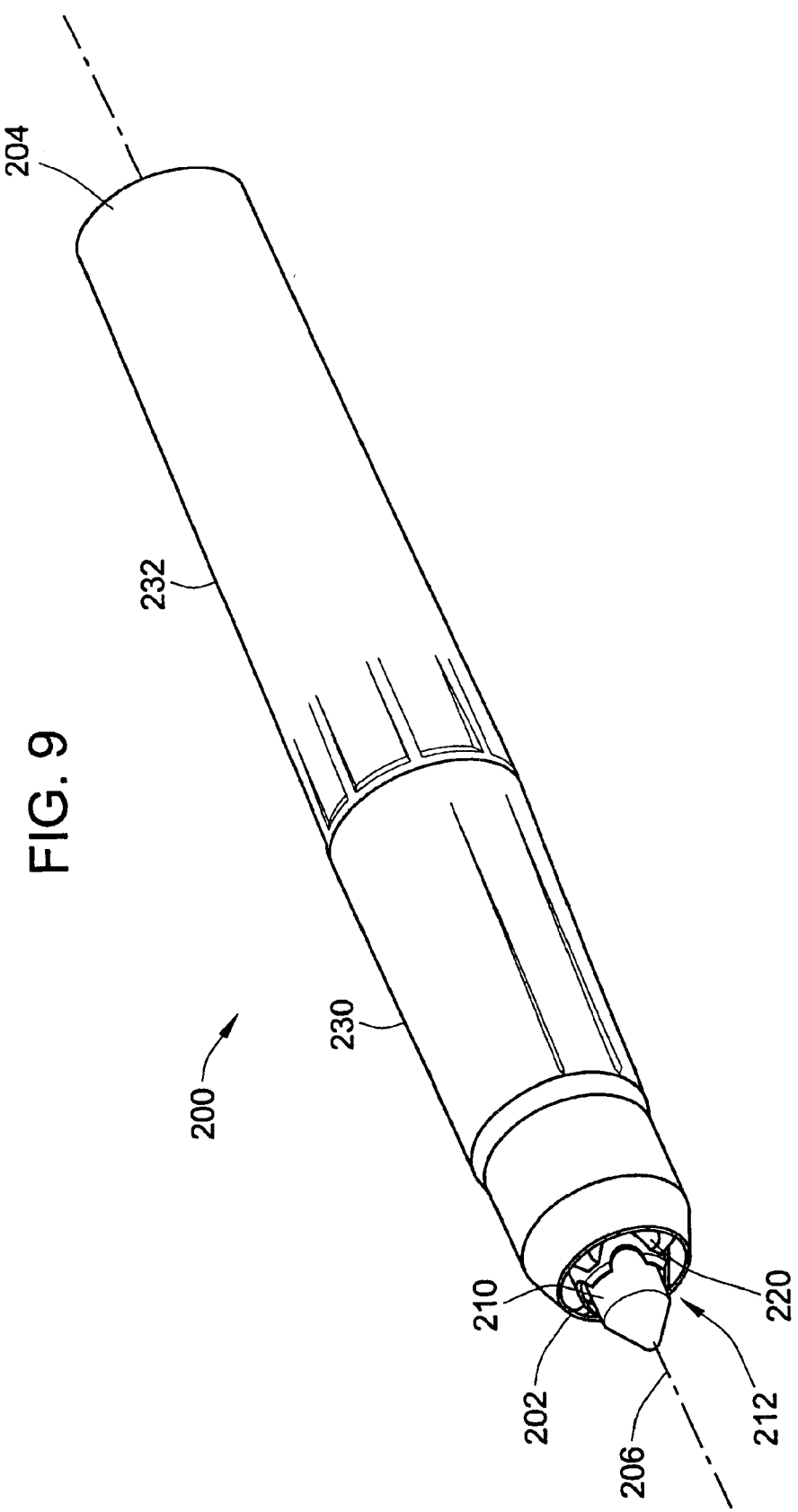
FIG. 9 is a front perspective view of another embodiment of the retractable marker that uses a different sleeve.

Referring to FIG. 3, to open the valve element 120 in such a manner that prevents the transfer of ink from the nib to the valve element, the marker includes a sleeve 180. Like the barrel components, the sleeve can be made from injection molded plastic. As illustrated in FIG. 8, the sleeve 180 is an elongated element having a cylindrical member 182 that extends between a forward end 184 and a rearward end 186. Disposed through the cylindrical member 182 is a circular channel 188. At the rearward end 186 perpendicular to the cylindrical member 182 is a pair of outward projecting plates 190. Extending beyond the rearward end 186 on either side of the channel is a pair of opposing fingers 192 having inner projecting catches 194 formed at their ends.

Also formed integrally into the cylindrical member 182 proximate to the rear end 186 is a pair of cantilevered arms 196. The cantilevered arms are located on opposing sides of the channel 188 corresponding to either side of the plates 190. Each cantilevered arm 196 includes at its distal end a beveled claw 198. The beveled claws 198 project outward from the circumference of the cylindrical member 182.

Referring to FIG. 5, when the marker 100 is assembled, the sleeve 180 is located inside of the front barrel 130. To protect the nib 110, the nib and forward portion of the nib holder 168 are inserted into the channel 182. When properly inserted, the conical tip 114 of the nib 110 is substantially coextensive with the forward end 184 of the sleeve 180. Moreover, the distal ends of the cantilevered arms 196 abut against the collar 169 formed on the nib holder 168. Accordingly, forward movement of the nib assembly 170 along the axis 106 will also urge forward the sleeve 180. At this stage, the nib assembly 170 and sleeve 180 are moving forward together with respect to the front and rear barrels 130, 132.

Referring to FIG. 6, when the sleeve 180 encounters the valve element 120, the forward end 184 of the sleeve 180 pushes apart the corner flaps 128 allowing the nib 110 to traverse the aperture 112. To expose the conical tip 114 when the marker 100 is in its extended configuration, the forward motion of the sleeve 180 is halted with respect to the nib assembly 170. Specifically, after the valve element 120 has been opened, the beveled claws 198 catch the annular lip 137 of the ledge 136 formed on the inner surface of the front barrel 130. As illustrated in FIG. 7, the beveled shape of the claws 198 raises the cantilevered arms 196 with respect to the cylindrical member 182 and above the collar 169 thereby allowing the collar to pass into the channel 188. Accordingly, the nib 110 and nib holder 168 slide forward within the halted sleeve 180 that holds the valve element 120 open. At this stage, only the nib assembly 170 is moving with respect to the inner and outer barrels 130, 132.

To enable the valve to close when the nib is retracted, the sleeve is again moved by the retracting nib holder. As illustrated in FIG. 8, this is accomplished by the rearward extending fingers 192 and the associated catches 194 on the sleeve 180. It will be appreciated that the catches 194 hook the rear side of the collar 169 so that, as illustrated in FIG. 6, the rearward movement of the nib assembly 170 urges the sleeve 180 from the valve element 120. Accordingly, when in the retracted configuration, the fingers 192 extend around the collar 169 with the catches 192 hooking the collar. Additionally, this also unhooks the beveled claws 198 and allows the cantilevered arms 196 to return to their original positions.

Linear movement of the nib along the axis may be accomplished in any of a number of acceptable manners. In the illustrated embodiment, to enable the linear movement of the nib 110 along the axis 106, the nib assembly 170 and rear barrel 132 form a drive screw. More particularly, as illustrated in FIG. 3, the rear barrel 132 includes a series of helical threads 139 formed on its inner surface proximate to the opened end 138 and extending partially toward the rear end 104. Additionally, the inner barrel 140 has, projecting outward from the circumference proximate to the second end 144 a pair of opposing protrusions 146. When the inner barrel 140 is received in the rear barrel 132, the protrusions 146 can engage the helical threads 139. Accordingly, rotating the rear barrel 132 with respect to the inner barrel 140 causes the helical threads 139 to drive the protrusions 146 parallel with the axis 106.

To prevent the nib assembly 170 from twisting with the rear barrel 132 during rotation, the nib assembly is locked with respect to the front barrel 130. To achieve the lock, the front barrel 130 includes a plurality of elongated, inward projecting, ribs 136 extending along its inner surface and parallel to the axis 106. To engage the ribs 136, the flange 162 of the coupling element 160 has formed on its outer circumference a plurality of notches 166 configured to slidingly pass along the ribs. It will be appreciated that the engagement of the ribs 136 and notches 166 allows for linear movement while preventing rotational movement of the nib assembly 170. Referring to FIG. 8, it will be appreciated that to prevent the sleeve from rotating, the plates 190 on the sleeve 180 can include similar notches 191 that also engage the ribs. Referring to FIGS. 5, 6, and 7, to ensure that the interior of the marker is adequately sealed after numerous rotations, the O-ring 128 enables rotational movement of while preventing leakage between the front and rear barrels 130, 132.

To prevent the nib from unintentionally retracting when in use, the marker can be designed to lock itself into the extended position. Referring to FIG. 3, to accomplish this, the protrusions 146 on the inner barrel 140 can be received and retrained in locking notches 148 that are formed as a non-helical portion of the helical thread 139. As will be appreciated from FIG. 7, as the nib assembly is extended and the protrusion 146 bottoms out with respect to the thread 139, the protrusion will rotate into the locking notch 148. Any linear forces transmitted rearward through the nib assembly 170, such as those developed during contact between the nib and a writing surface, will be opposed by engagement between the protrusion and the locking notch. Hence, the protrusion will not begin to rotate back up the helical threads causing unintended retraction of the nib. To disengage the protrusion 146 and the locking notch 148, the rear barrel 132 is rotated with respect to the nib assembly 170 moving the protrusion back into the helical portion of the threads 139.

Figure 10:
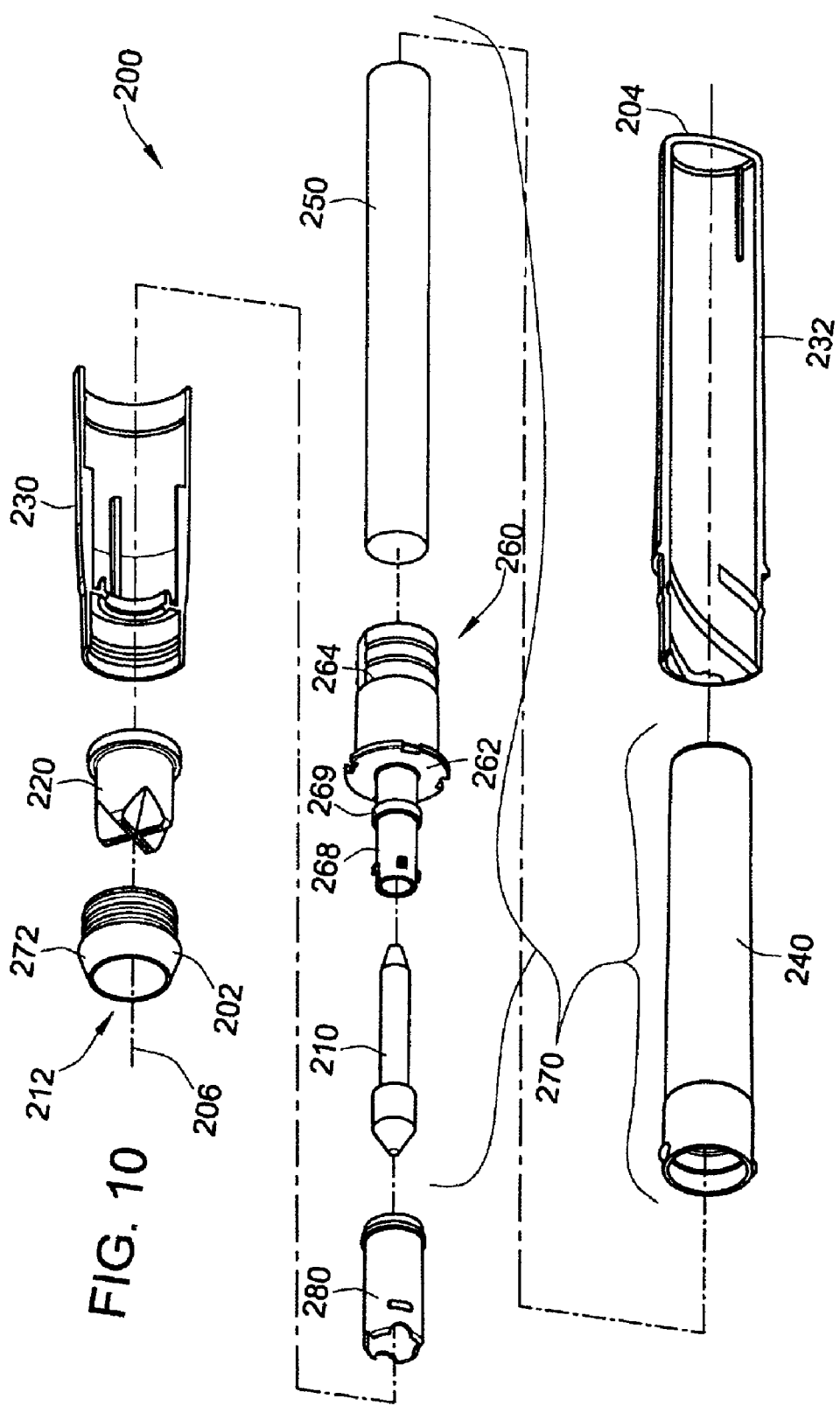
FIG. 10 is an exploded view illustrating the components of the marker embodied in FIG. 9.

Illustrated in FIGS. 9, 10, 11, and 12 is another embodiment of a retractable marker 200 designed in accordance with the present invention. As before, the marker 200 has a front end 202 and a rear end 204 that provide directional orientation. Referring to FIG. 10, the marker 200 also includes a front barrel 230, a rear barrel 232, and an inner barrel 240, all shaped as generally cylindrical tubes aligned about a common axis 206. For storing ink, the marker 200 also includes a reservoir made of porous or fibrous material and shaped as an elongated cylinder 250. Again, however, the reservoir can be made from different materials or designs, such as a free ink volume reservoir. The reservoir cylinder 250 is received in the inner barrel 240 and enclosed therein by a coupling element 260. Held within and projecting through the coupling element 260 such that it contacts the reservoir cylinder 250 is a nib 210 that can also be made of a porous or fibrous material. The nib 210, coupling element 260, reservoir cylinder 250, and inner barrel 240 form a nib assembly 270 that can linearly move along the axis 206 between a retracted and an extended configuration.

The marker 200 also includes an aperture 212 disposed through a muzzle 272 attached to the front end 202 of the front barrel 230 and through which the nib 210 can linearly traverse. To seal the aperture 212 when the nib 210 is retracted, a valve element 220, such as a duckbill valve, made of resilient material is located proximate to the front end 202. To open and close the valve element without transfer of ink from the nib 210 to the valve element, the marker 200 also includes a movable sleeve 280 in which the nib 210 and the forward portion of the coupling element 260 are received.

Figure 13:
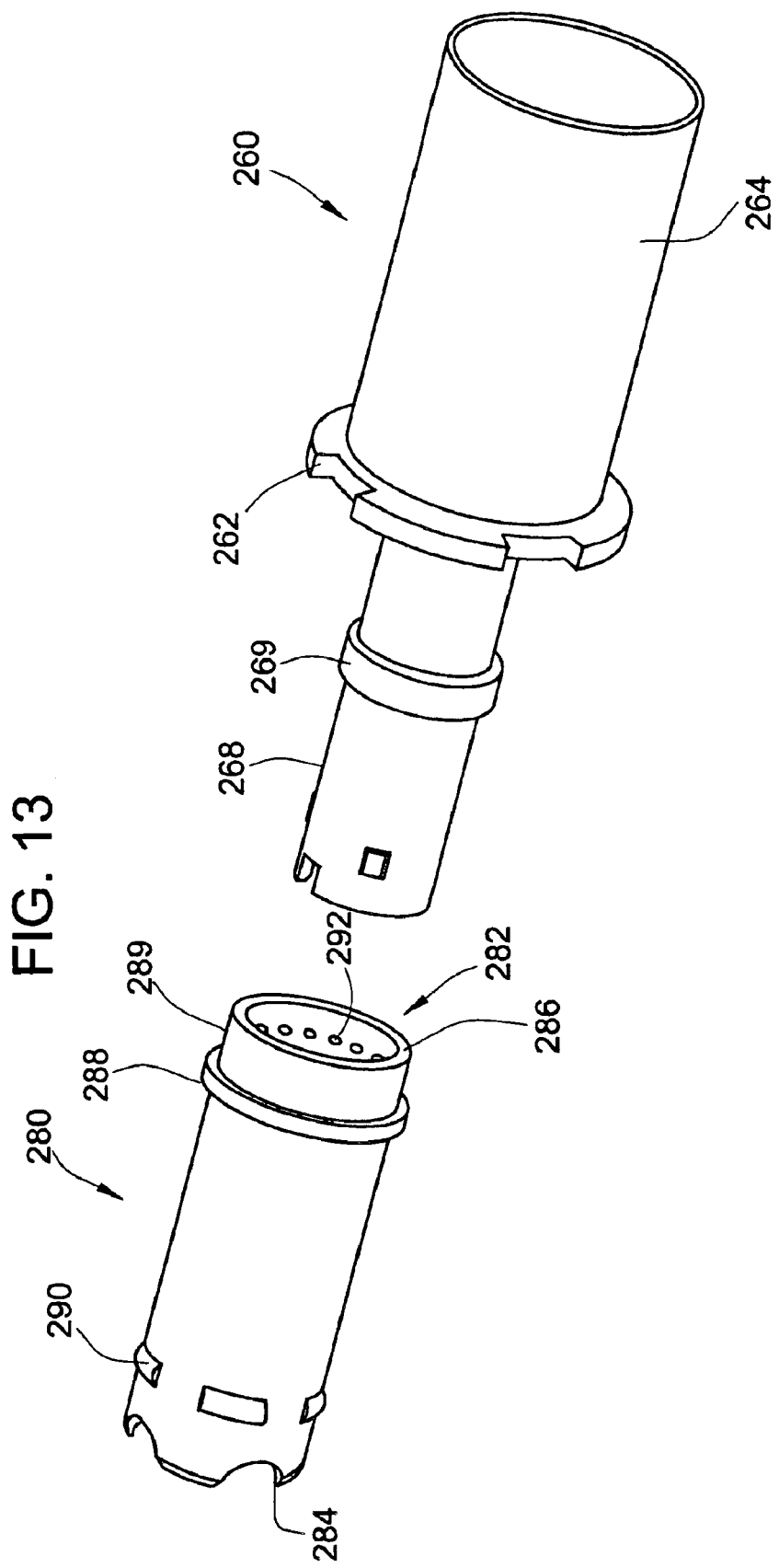
FIG. 13 is a rear perspective view illustrating the sleeve and the coupling element of the marker embodied in FIG. 9.

The sleeve 280 and coupling element 260 engage each other such that nib 210 can traverse the aperture 212 and extend exposed from the front end 212. Specifically, as illustrated in FIG. 13, the sleeve 280 is a generally cylindrical tube that defines a channel 282 having a first end 284 and a second end 286. Furthermore, the sleeve 280 has proximate to its second end 286 a circular shoulder 288 running about its circumference and extending outward therefrom. Also running about the outer circumference proximate to the first end 284 of the tubular sleeve 280 is a first ring of raised bumps 290. Additionally, located proximate the second end 286 on the inner surface of tubular sleeve 280 is a second ring of raised bumps 292 running about the inner circumference protruding into the channel 282. The coupling element 260 includes a circular flange 262 from which extends in the rearward direction a plug 264 while in the forward direction there extends a nib holder 268. The nib holder 268 is a generally circular tube that includes a collar 269 extending outwardly from its circumference and that is offset from the flange 262.

Figure 11:
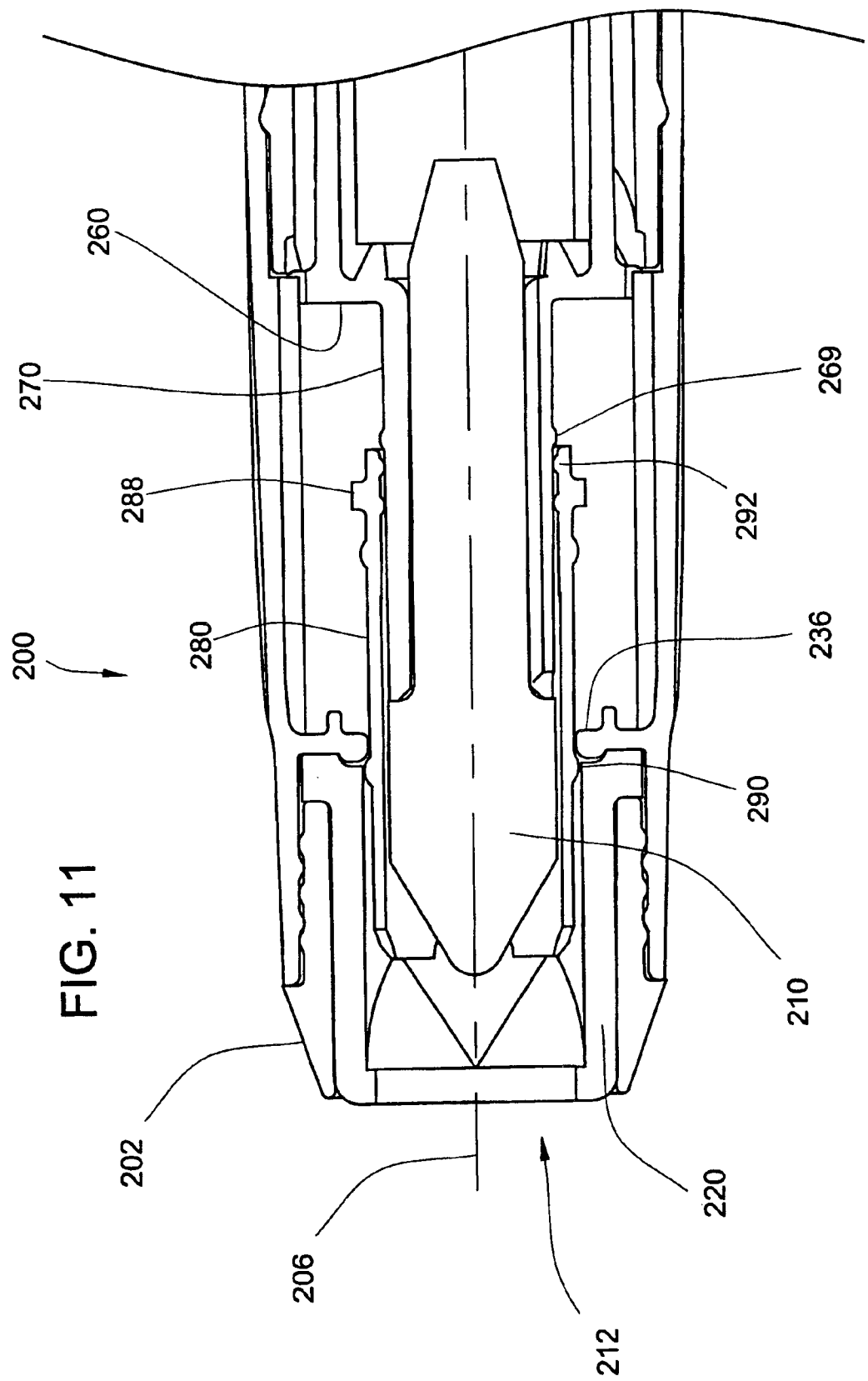
FIG. 11 is a cross-sectional view of the assembled marker embodied in FIG. 9 illustrating the marker in its retracted configuration.
Figure 12:
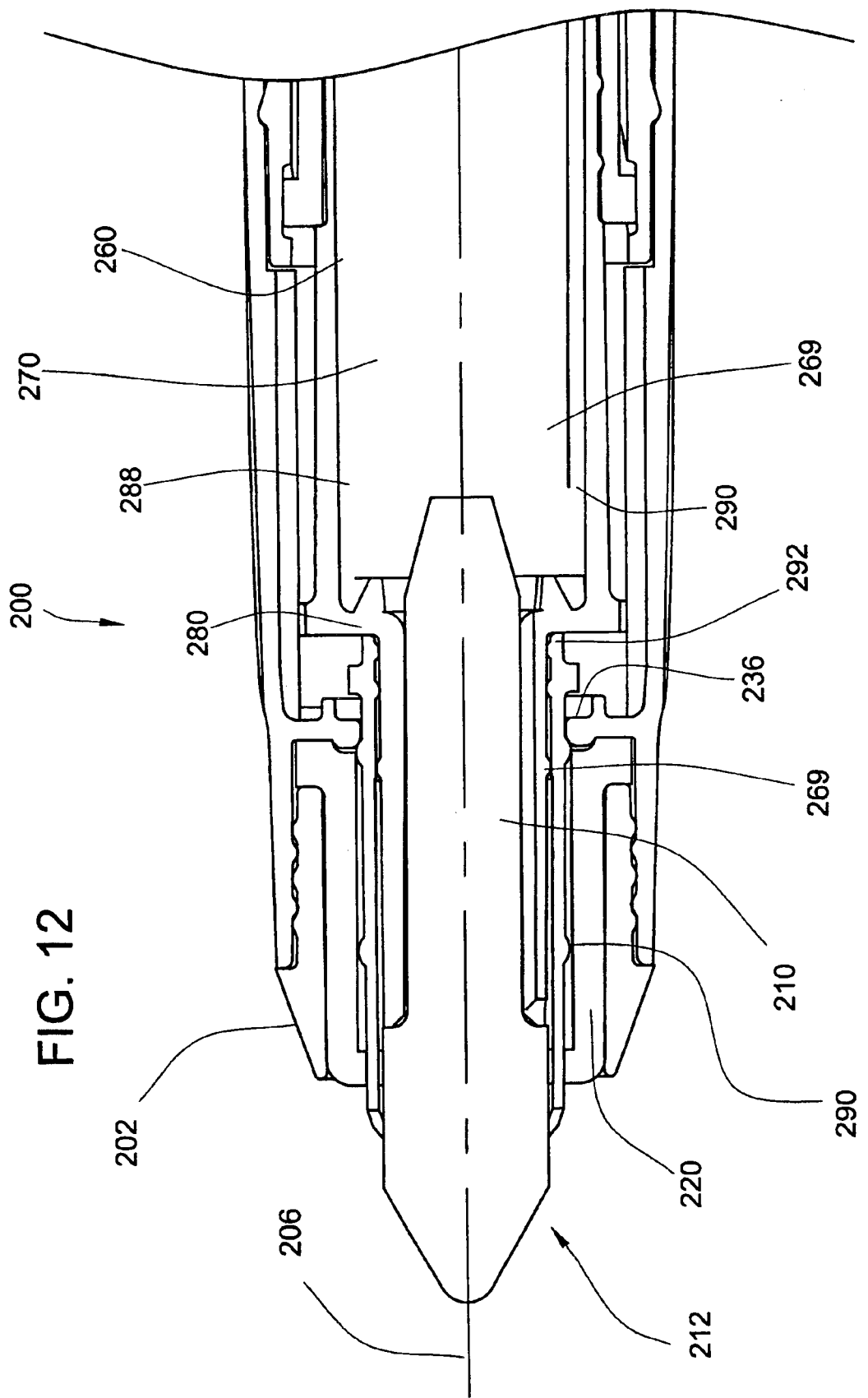
FIG. 12 is a cross-sectional view of the assembled marker embodied in FIG. 9 illustrating the marker in its extended configuration.

When assembled in the retracted configuration, as illustrated in FIG. 11, the nib 210 is protectively enclosed within the sleeve 280. Moreover, abutting against the second ring of raised bumps 292 and oriented towards the rear end 204 of the marker 200 is the collar 269. The first ring of raised bumps abuts against an inward extending ledge 236 formed on the inside of the front barrel 230 proximate the front end 202 of the marker 200. Referring to FIGS. 11 and 12, as the nib assembly 270 is linearly moved forward, the collar 269 abutting the second ring of bumps 292 will likewise drive the sleeve 280 forward to open the valve element 220 in the manner described above. At this stage, the nib assembly 270 and sleeve 280 are moving together with respect to the front and rear barrels 230, 232.

To halt the forward movement of the sleeve 280 with respect to the nib assembly 270 after the valve element 220 is opened, it will appreciated that forward movement of the sleeve will cause the shoulder 288 to abut against the ledge 236. Therefore, though the forward movement of the sleeve 280 is halted, the continued forward movement of the nib assembly 270 forces the collar 269 to pass across the second ring of bumps 292 and into the channel 282. At this stage, only the nib assembly 270 is moving with respect to the front and rear barrels 230, 232. This enables the nib 210 to traverse the aperture to the extended configuration in which the nib is exposed for writing.

After use, as the nib assembly 270 is lineally retracted into the marker 200, it will be appreciated that the rearward moving collar 269 will abut against the second ring of bumps 292, but now on the side of the bumps proximate the front end 202. Continued rearward movement of the nib assembly 270 will cause the collar 269 to push the sleeve 280 rearward thereby allowing the valve element 220 to close and seal the aperture 212. To reposition the collar 269 on the rearward side of the second ring of bumps 292 after the sleeve 280 is removed from the valve element 220, the linear movement of the sleeve is again halted. To accomplish this, the first ring of bumps 290 abuts against the inner extending ledge 236 formed on the first barrel 230 thereby halting the motion of the sleeve 280 with respect to the nib assembly 270. The continued movement of the nib assembly 270 causes the collar 269 to pass across the second ring of bumps 292.

Figure 14:
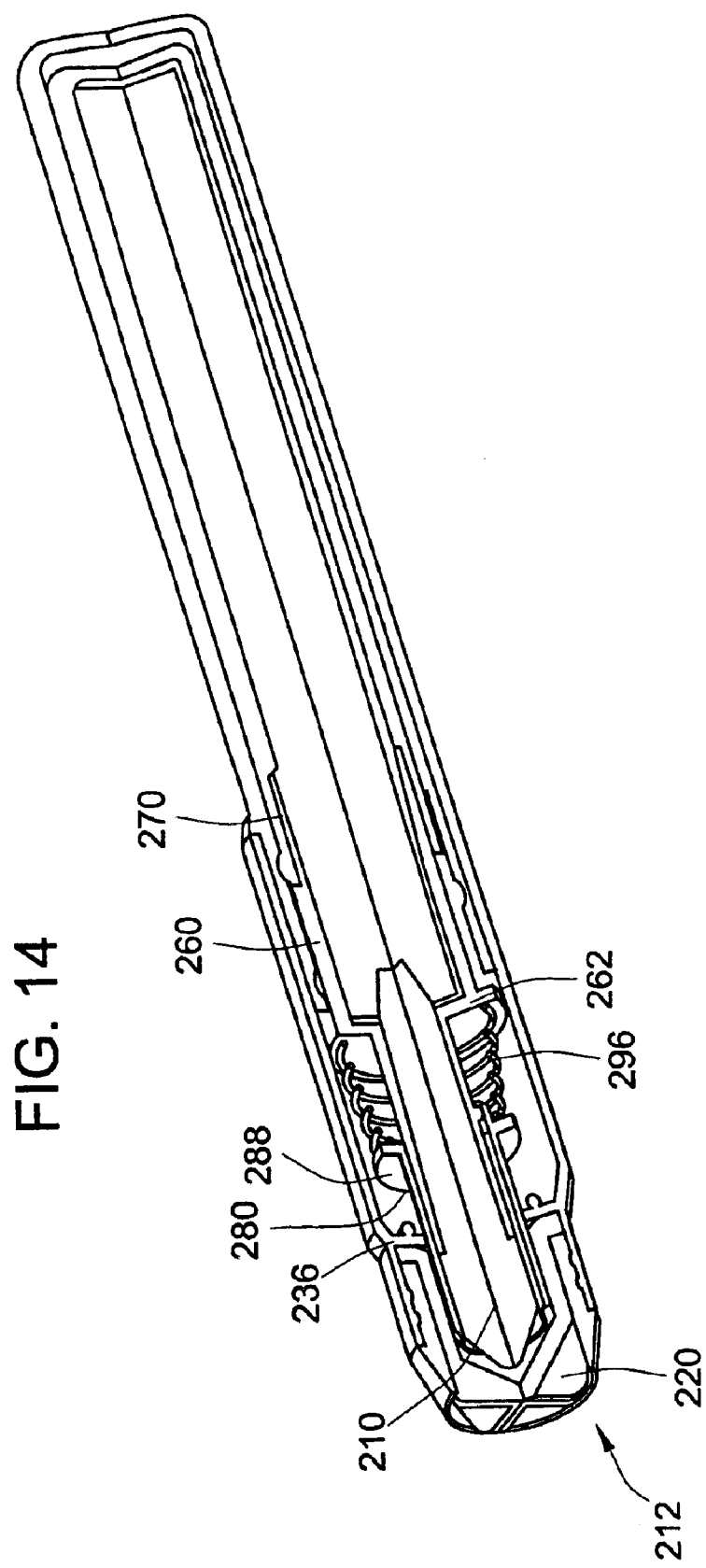
FIG. 14 is a cut-away perspective view of another embodiment of a retractable marker as assembled and designed to include a spring.

Referring to FIGS. 14, 15, and 16, in another embodiment of the previously described marker 200, to assist the sleeve 280 in unsealing the valve, a spring 296 may be included. As best illustrated in FIGS. 15 and 16, the spring 296 is a helical spring extending between the collar 269 on the sleeve 280 and the flange 262 on the coupling element 260. When the marker 200 is in its retracted configuration, the spring 296 is generally in its relaxed state. When the forward movement of the nib assembly 270 causes the sleeve 280 to engage the valve element 220, any resistance by the valve element against the sleeve will result in a compressive force being imparted onto the spring. Accordingly, the spring 296 will urge the sleeve 280 forward to unseal the valve element 220. Once the shoulder 288 abuts against the ledge 236 halting any further movement of the sleeve 280, the spring 296 then compresses between the shoulder 288 and the flange 269. Furthermore, the spring 296 can recover upon retraction of the nib assemble 270.

Referring to FIG. 17 through 23, there is illustrated another embodiment of a retractable marker 300 designed in accordance with the teachings of the present invention. Again the retractable marker 300 has an elongated, generally cylindrical shape aligned about a longitudinal axis 306 and includes a front end 302 and a rear end 304, thereby providing directional orientation. Disposed through the front end 302 is an aperture 312 through which a nib 310 can extend for writing. To prevent the nib 310 from drying out when not in use, the nib can be retracted into the aperture by mechanical manipulation of the marker 300. To seal the aperture once the nib is retracted, the present embodiment of the marker includes a sealing element that is designed as a sliding door that overlaps the aperture.

Figure 18:
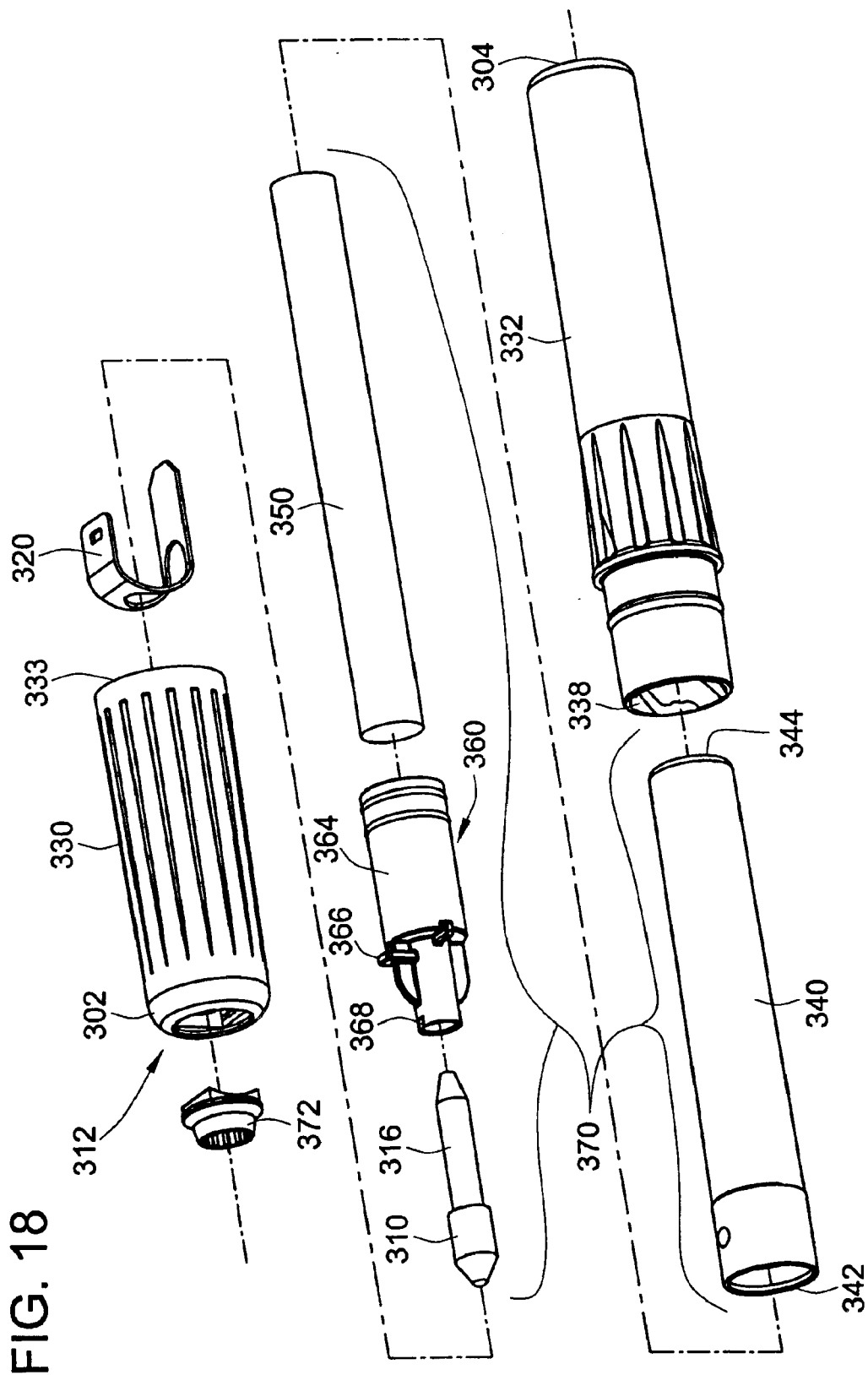
FIG. 18 is an exploded view illustrating the components of the marker embodied in FIG. 17.

Illustrated in FIG. 18 are the components of the retractable marker 300 including the nib 310 and the sliding door 320. Additionally, the marker 300 includes a front barrel 330 and a rear barrel 332 that make up the exterior body of the marker 300 and provide for an interior volume. The front and rear barrels 330, 332 can be cylindrical tubes made of injection molded plastic. The front barrel 330 includes the front end 302 through which the aperture 312 is disposed and an opposing end 333 corresponding to the rearmost part of the front barrel. Press-fit into the front end 332 can be a nozzle 372 that includes a hole corresponding to the aperture 312. Formed as part of the rear barrel 332 is the rear end 304 that encloses the tubular structure. An opposing end 338, which corresponds to the forwardmost part of the rear barrel 332, is opened to provide access to the interior of the rear barrel. As illustrated in FIG. 17, when assembled, the front and rear barrels 330, 332 are aligned about the axis 306 and abut against each other to provide a seamless, aesthetic appearance.

Referring to FIG. 18, the marker also includes a hollow, tubular inner barrel 340 that is opened at a first end 342 and closed at a second end 344 which also can be made of injection molded plastic. To store the fluid ink, an elongated reservoir cylinder 350 is included that can be made from porous or fibrous material. The reservoir cylinder 350 is received inside the inner barrel 340 and enclosed therein by a coupling element 360. The coupling element 360 has a plug 364 extending rearward that can be press-fit into the opened end 342 of the inner barrel 340. Located in front of the plug 364, the coupling element 360 also includes an upright prong 366. To hold the nib 310 in such a manner that the nib contacts the enclosed reservoir 350, the coupling element 360 also includes a nib holder 368 that is formed as a circular tube. An elongated arm 316 formed as part of the nib 310 can be received within the nib holder 368. Accordingly, the nib 310, coupling element 360, reservoir cylinder 350, and inner barrel 340 are secured together to form a fixed nib assembly 370.

Figure 19:
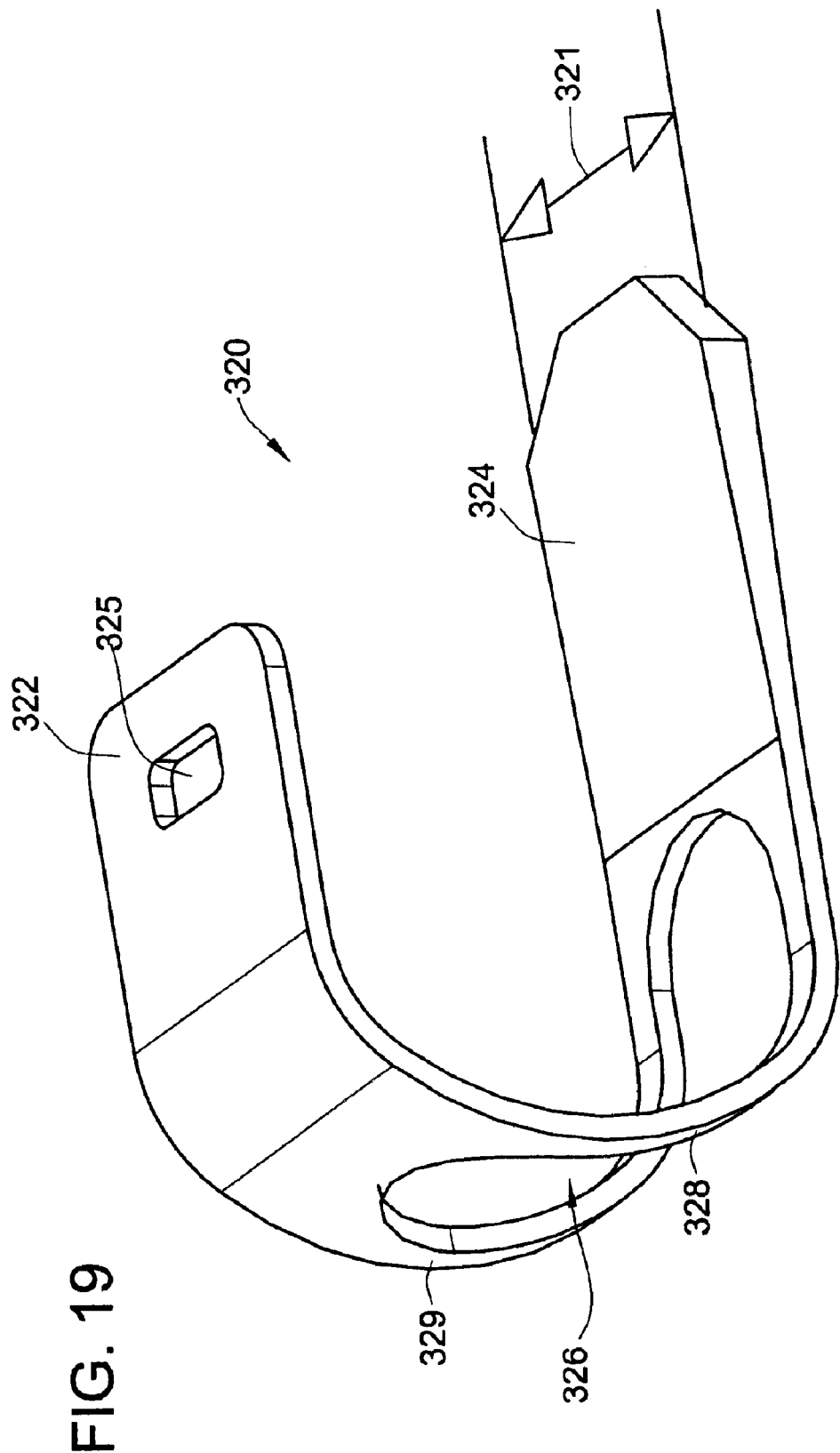
FIG. 19 is a front perspective view of the sliding door.

As better illustrated in FIG. 19, the sliding door 320 is an elongated, thin strip of material having a given width 321 and that is bent back upon itself to generally provide a C-shape. The sliding door therefore has an upper end 322 and an opposing lower end 324. Preferably, the strip of material at the lower end 324 is thicker than that associated with the upper end 322. Disposed through the strip of material making up the sliding door 320 proximate to the upper end 322 is a puncture 325 while the region proximate the lower end 324 is formed as a continuous surface. Disposed through the width of the sliding door 320 between the upper and lower ends 322, 324 is an elongated slot 326. Accordingly, only two strips of material 328, 329 interconnect the upper and lower ends 322, 324. Preferably, the sliding door 320 is made from a flexible material such as a thin plastic or silicon rubber.

Figure 21:
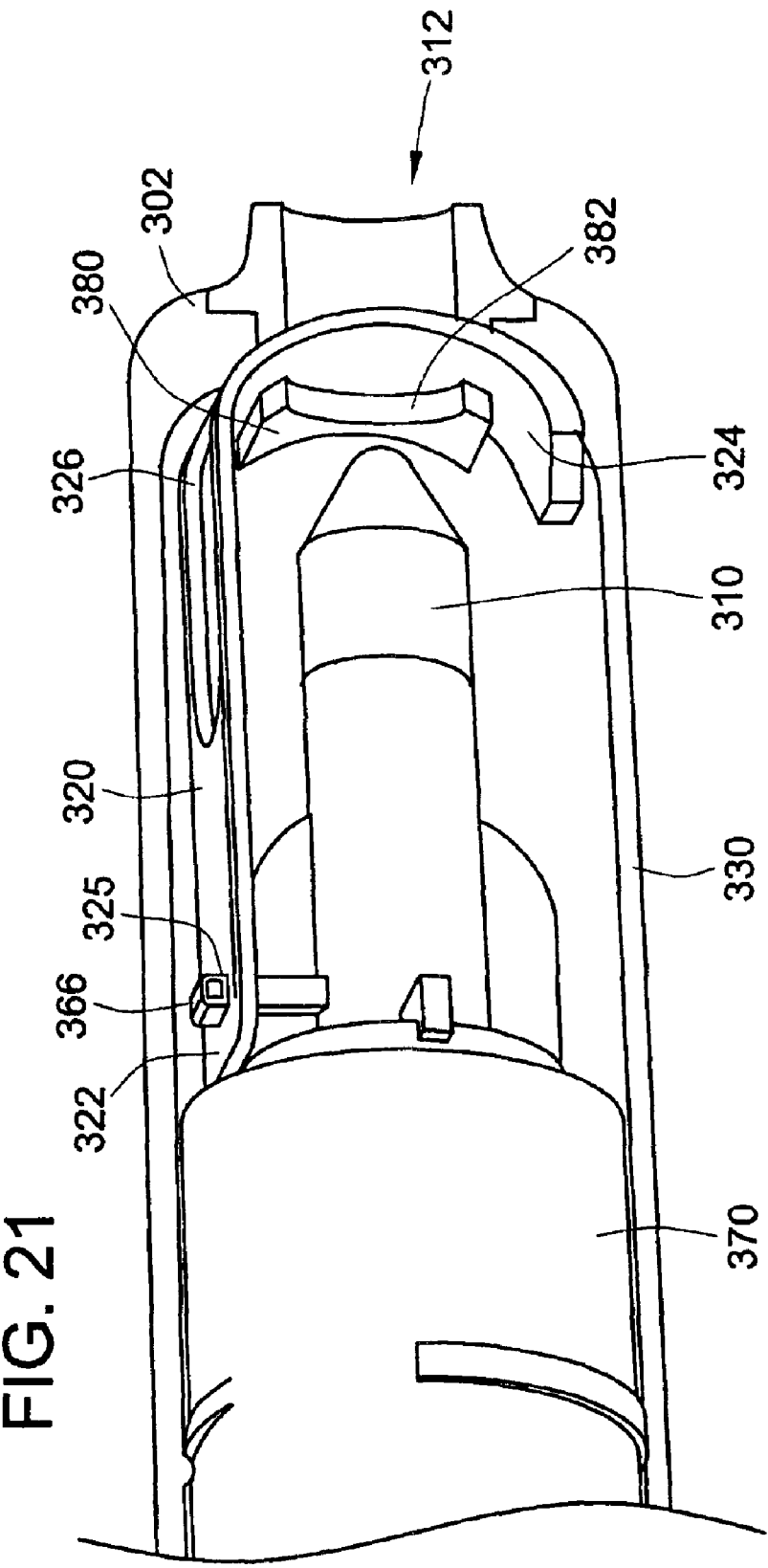
FIG. 21 is a cut-away view of the front of the marker in its retracted configuration.
Figure 23:
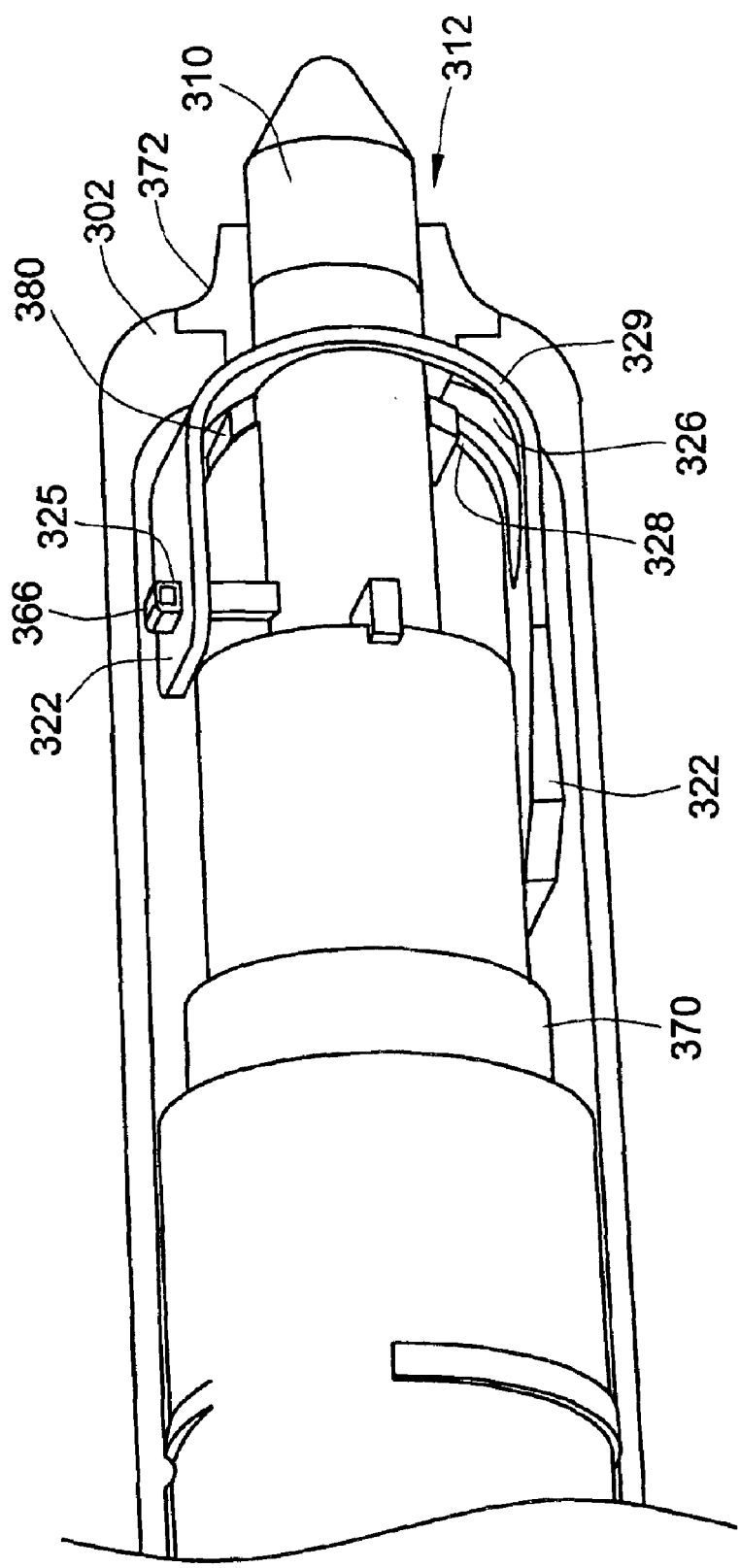
FIG. 23 is a cut-away view of the front of the marker as in its extended configuration.

Referring to FIGS. 20 and 21, when the marker 300 is properly assembled and the nib 310 is retracted, the lower end of the sliding door 320 curves about the inner portion of the front end 302 of the front barrel 330. In this configuration, the lower end 324 is aligned with and overlaps the aperture 312 and seals the interior of the marker 300. Furthermore, the slot 326 is generally located above and parallel to the nib 310 and axis 306. Referring to FIGS. 22 and 23, to enable the nib 310 to traverse the aperture 312 when the nib assembly 370 is extended lineally forward along the axis 306, the sliding door 320 is moved so that the slot 326 is aligned with the aperture and perpendicular to the nib and axis 306.

More particularly, the upper end 322 of the sliding door is attached to the nib assembly 370 by inserting the prong 366 through the puncture 325. Accordingly, as the nib assembly 370 is moved forward, the lower end 324 is forced to slide rearward below the nib assembly. Importantly, to prevent the nib 310 from colliding with the lower end 324, the sliding door 320 should be dimensioned such that the slot 326 aligns with the aperture 312 before the nib begins to traverse the aperture. As will be appreciated, when the rearward movement of the nib assembly 370 retracts the nib 310, the slot 326 is also moved away from the aperture 312 and the lower end 324 again overlaps the aperture.

Referring to FIG. 21, for holding the sliding door 320 in alignment with the aperture 312, a slide guide 380 is included at the front end 302 of the front barrel 330. The slide guide 380 is a plate offset from and attached to the interior of the front barrel 330. The slide guide 380 thereby creates a gap between itself and the interior of the front barrel 330 through which the sliding door 320 can pass. The slide guide 380 also includes a hemispherical cut 282 that corresponds to the aperture and permits the nib to traverse through. As will be appreciated from FIGS. 20 and 21, because of the thicker material at the lower end 324, the lower end has a tendency to wedge between the slide guide 380 and the front barrel 330 to further improve the seal between the sliding door and the aperture. As illustrated in FIG. 22, even when the slot 326 is aligned with the aperture 312, the strip 328 of the sliding door 320 is still retained by the slide guide 380. It will be appreciated that a second slide guide can also be provided on the opposite side of the aperture corresponding to the second strip 329. It will also be appreciated that in some embodiments, the slide guide can be formed as an integral part of the nozzle 372 as opposed to the front barrel 330. It will also be appreciated by those of skill in the art that linear motion of the foregoing embodiment can be achieved by rotating portions of the body, as described with respect to FIG. 3, or by depressing a button as described with respect to FIG. 28.

Figure 24:
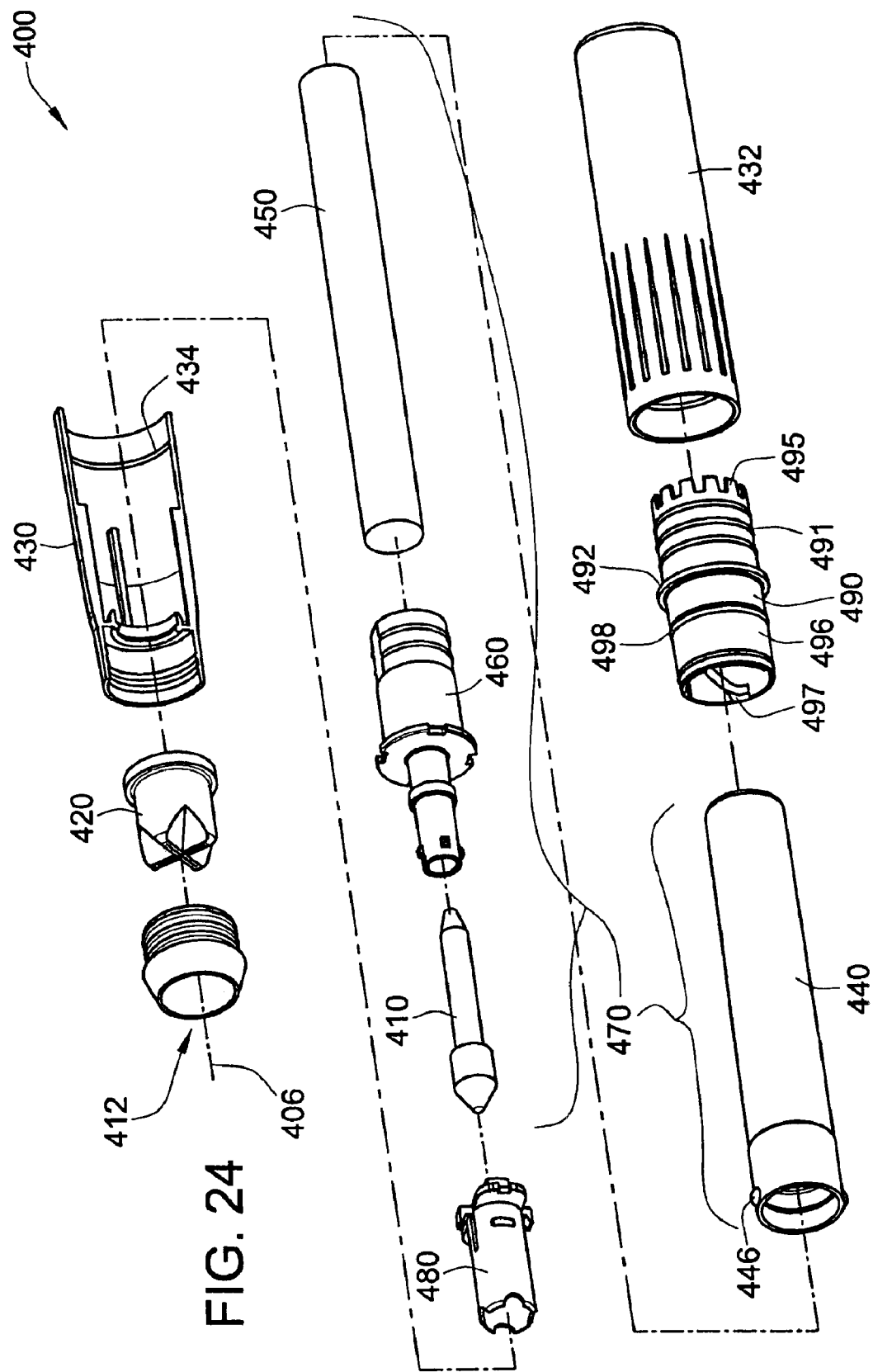
FIG. 24 is an exploded view illustrating the components of an embodiment of a retractable marker employing a sleeve and a valve and having a different style barrel design.
Figure 25:
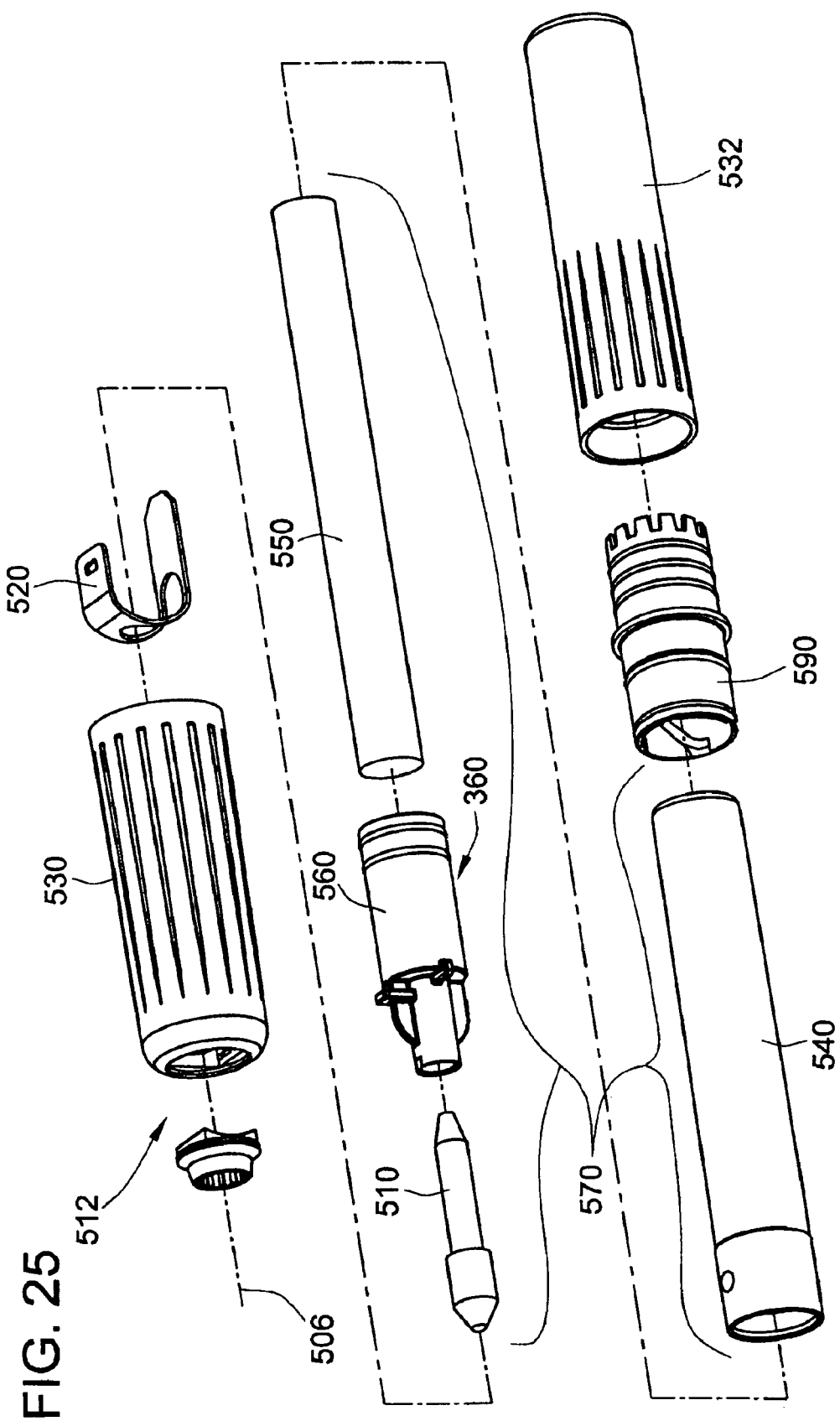
FIG. 25 is an exploded view illustrating the components of an embodiment of a retractable marker employing a sliding door and having a different style barrel design.

Illustrated in FIGS. 24 and 25 are embodiments of markers 400, 500 that employ a variation on the barrel structures that makes up the exterior body. FIG. 24 illustrates the valve element design employing the new barrel variation. The marker 400 includes nib assembly 470 made up from a nib 410, coupling element 460, reservoir cylinder 450, and inner barrel 440 that can reciprocally move within the marker along an axis 406. The marker also includes a sleeve 480 and valve element 420 configured to open and close the aperture 412. The exterior of the marker 400 is formed by a front barrel 430 and a rear barrel 432 that are aligned about the axis 406. Located between and joining together the front and rear barrels 430, 432 is an intermediate collet 490 that can be made from injection molded plastic. The purpose of the intermediate collet 490 is to enhance the appearance of the marker 400 by streamlining the transition between the front and rear barrels.

The intermediate collet 490 includes a annular rim 492 to the rear of which extends a circular rear projection 494 that can be press-fit into the rear barrel 432. Extending forward from the rim 492 is a circular forward projection 496 that can be roatatably received in the front barrel 430. Accordingly, the front projection 496 must have a smaller diameter than the front barrel 430. To hold the front and rear barrel 130, 132 together, a outward extending, circular shoulder 498 formed on the forward projection 496 perpendicular to the axis 406 can be received in a corresponding groove 434 formed the front barrel. To enable linear motion of the nib assembly when the barrels are rotated with respect to each other, the helical threads 497 are formed on the inner surface of the forward projection 496 and can engage protrusions 446 on the inner barrel 440. To lock the intermediate collet 490 so as to rotate along with the rear barrel 332, there is formed on the rear projection 494 a plurality of teeth 495 that can engage a locking structure formed inside of the rear barrel. When assembled, it will be appreciated that the annular rim 492 is coextensive with the exterior surfaces of the front and rear barrels 430, 432.

The embodiment illustrated in FIG. 25 similarly includes a front barrel 530 and rear barrel 532 joined together by an intermediate collet 590. In this embodiment, the nib assembly 570, which includes a nib 510, coupling member 560, reservoir cylinder 550 and inner barrel 540, is configured to engage a sliding door 520 to seal and open the aperture 512 as the nib assembly is extended and retracted.

Figure 26:
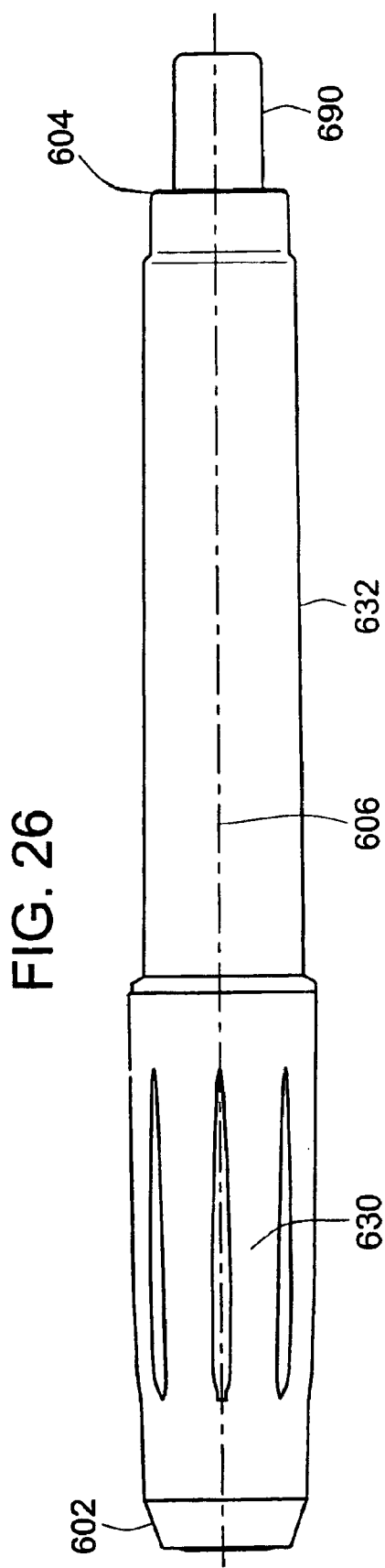
FIG. 26 is a side elevational view illustrating another embodiment of a retractable marker designed with a push button for facilitating extension and retraction.
Figure 27:
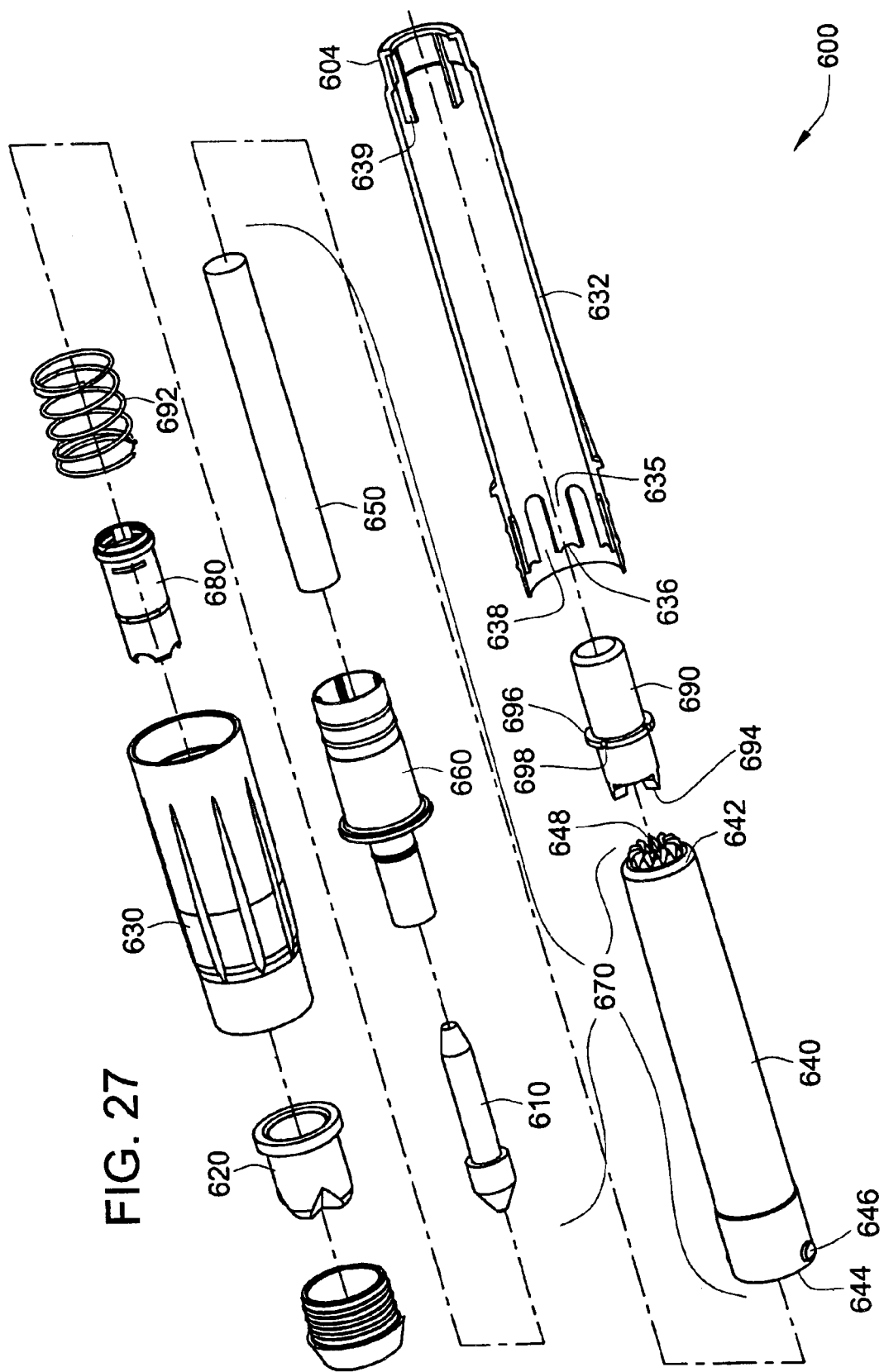
FIG. 27 is an exploded view illustrating the components of the marker of FIG. 26.
Figure 28:
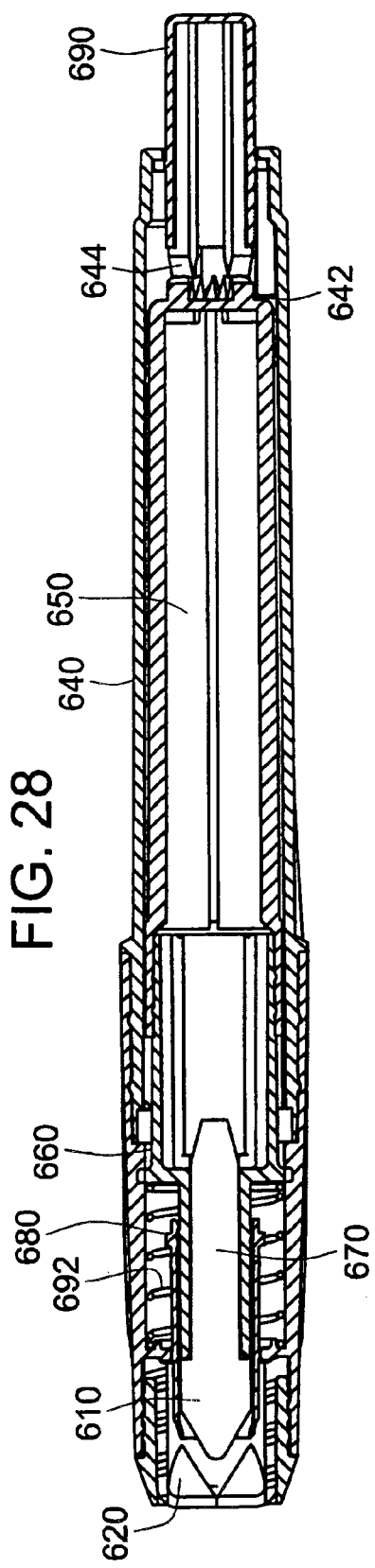
FIG. 28 is a cross-sectional view of the marker of FIG. 26 illustrating the assembled marker in the retracted configuration.

Illustrated in FIGS. 26, 27, and 28 is another embodiment of the inventive marker 600 designed so that the linear movement of the nib assembly is accomplished by depressing a button 690 extending from the rear end 604 of the rear barrel 632. When the button is so depressed, the nib can extend and retract through the front end 602 of the front barrel. The components of the marker 600, which are better illustrated in FIG. 27, include the nib assembly 670 that is configured to reciprocally move along the axis 606 within the front and rear barrels 630, 632. The nib assembly includes a nib 610, a coupling element 660, an inner barrel 640, and reservoir cylinder 650 assembled together. To seal the marker when in the retracted position, in the illustrated embodiment the front barrel 630 includes a valve element 620 that can be opened by a sleeve 680 engaging the nib assembly. Of course, it will be appreciated by those of skill in the art that the push button design can also be arranged to function with embodiments employing the sliding door.

To extend and retract the nib assembly 670 by depressing the push button 690, the push button extends through the opened rear end 604 of the rear barrel to abut the closed end 642 of the inner barrel 640. Formed on the opened end 644 of the inner barrel 640 is an outward extending protrusion 646 generally perpendicular to the axis 606. Furthermore, the rear barrel 632 has cut into its inner surface a plurality of elongate slots 638 arranged in a circumference axis 606. The slots 638 extend from the front end 133 of the rear barrel 632 part way towards the rear end 604 and generally parallel to the axis 606. Interspaced between the slots 638 is an elongated, raised ridge 635 that includes a cup 636 formed proximate to front end. As will be appreciated, when the inner barrel 640 is assembled into the rear barrel 632, the protrusion 646 is coextensive with the slots 638 and ridges 635.

Also located inside the front barrel 630 is a spring 692 that, when assembled as illustrated in FIG. 28, biases the nib assembly 670 rearward. Accordingly, as will be appreciated from FIG. 28, if the protrusion 646 is aligned with a slot 638, the protrusion will be urged toward the rear of the slot causing the nib assembly 670 to retract. If the protrusion 646 is aligned with a ridge 635, the protrusion will be received in the cup 636 causing the nib assembly 670 to extend with the nib traversing the aperture. The shape of the cup 636 prevents the protrusion 646 from realigning within the slot 638 and unintentionally allowing the nib assembly 670 to retract. Furthermore, the cup 636 serves to oppose any rearward imparted forces that are generated during use.

To alter the alignment of the protrusion 646 with the ridge 635 or slot 638, there is formed on the closed end 642 of the inner barrel 640 a crown 648 of inclined teeth arranged around the circumference of the inner barrel. A corresponding crown 694 of inclined teeth on the forward end of the push button 690. As will be appreciated by those of skill in the art, when the two crowns engage, the inclined nature of the teeth will cause one crown to rotate with respect to the other. Accordingly, by preventing rotation of the pushbutton 690, the inner barrel 640 is caused to rotate thereby altering the alignment of the protrusion 646 from a slot 638 to a ridge 635. Rotation of the pushbutton 690 can be prevented by engaging grooves 698 formed in a circular flange 696 included on the push button with ribs 639 formed on the inner surface of the rear end 604 of the rear barrel 632.

Figure 29:
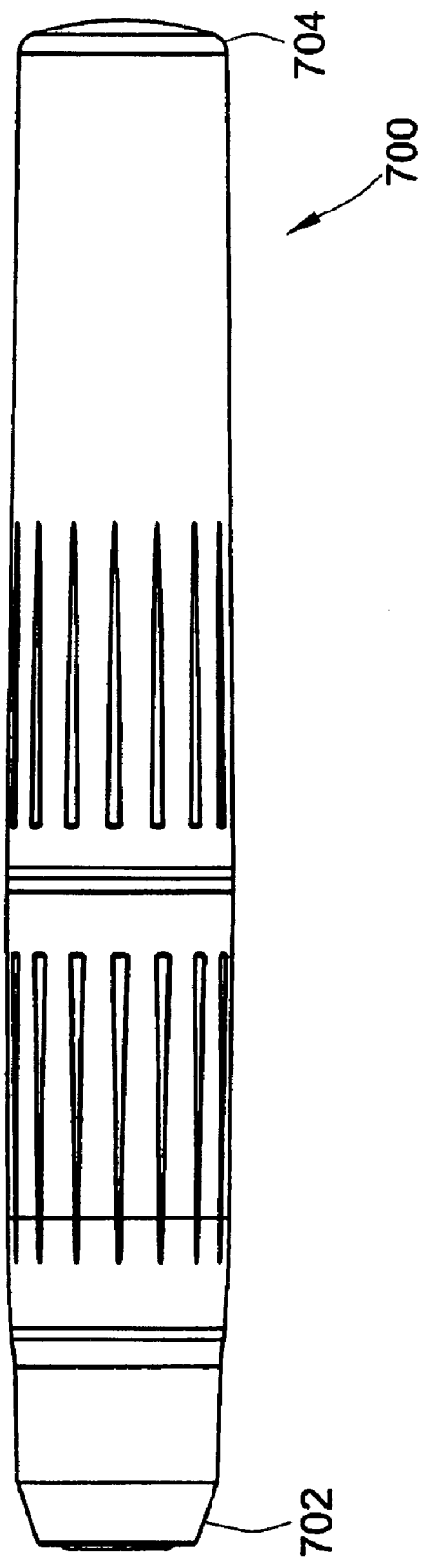
FIG. 29 is a side elevational view illustrating another embodiment of a retractable marker designed to employ a free ink system.
Figure 30:
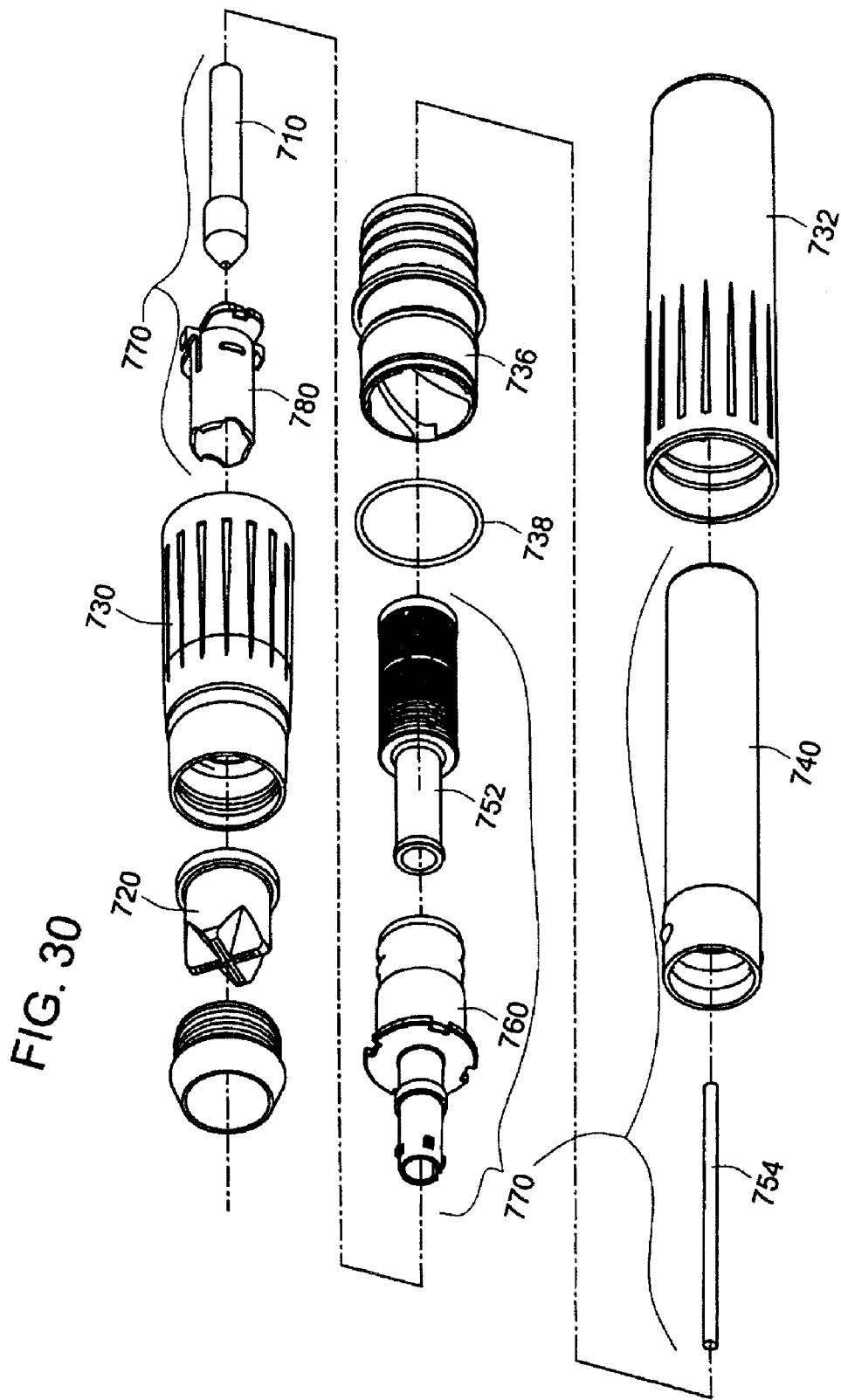
FIG. 30 is an exploded view illustrating the components of the marker of FIG. 29.
Figure 31:
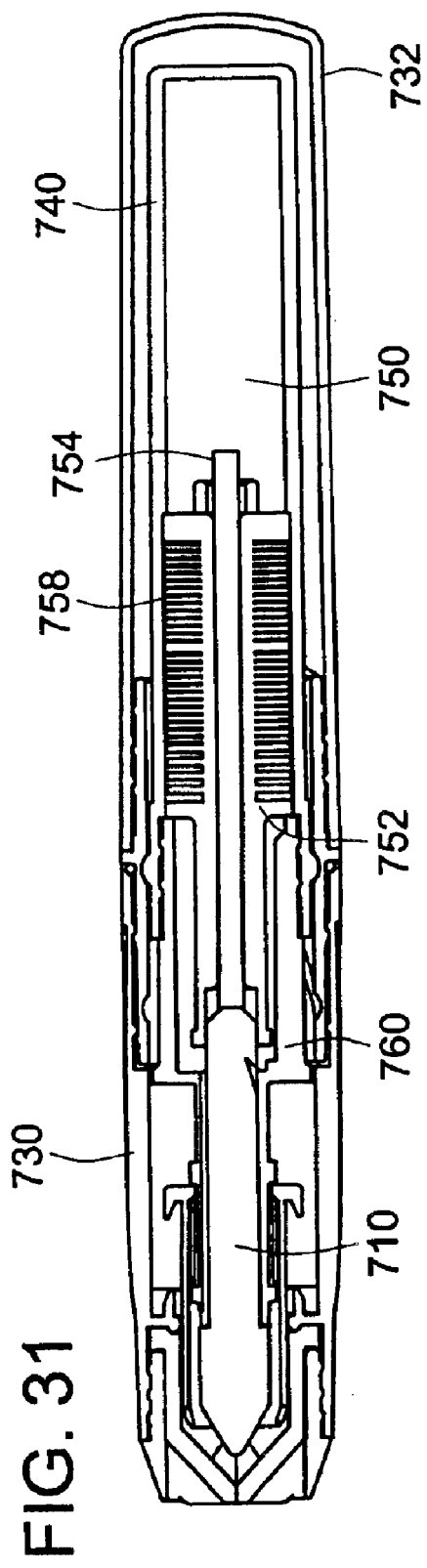
FIG. 31 is a cross-sectional view of the marker of FIG. 29 illustrating the assembled marker in the retracted configuration.

Illustrated in FIGS. 29, 30, and 31 is an embodiment of the retractable marker 700 that incorporates a variation of the free ink system mentioned above. While the illustrated embodiment is designed to use a valve element 720 and sleeve 780 to seal the marker 700, it will be appreciated by those of skill in the art that the free ink system can be employed in other marker designs such as those employing a sliding door. As illustrated in FIG. 29, the marker 700 includes a front end 702 and an opposing rear end 704. As illustrated in FIG. 30, the marker 700 includes a front barrel 730 and a rear barrel 732 that define an interior volume. Also included to join together the front and rear barrels in a well-sealed manner can be an intermediate collet 736 and a O-ring 738.

Reciprocal within the front and rear barrel is a nib assembly 770 including a nib 710, coupling element 760, and inner barrel 740. Referring to FIGS. 30 and 31, instead of including a fiberous or porous cylindrical structure though, the reservoir is formed as a volume 750 produced by press-fitting a stopper element 752 into the inner barrel 740. Fluid ink can then be freely retained with in the reservoir volume 750. To transfer fluid ink from the reservoir volume 750 to the nib 710, a transfer rod 754 capable of conducting ink extends through the stopper element 752 between the reservoir and nib. As will be appreciated by those of skill in the art, in an embodiment, the coupling element and stopper element can be integrally formed as the same part.

As will be appreciated by those of skill in the art, to enable transfer of ink from the reservoir volume to the nib, air must be able to bleed back into the reservoir volume and thereby prevent a vacuum from forming. Furthermore, the marker must be designed to prevent ink from leaking through the stopper element 752 as the pressure and temperature inside the reservoir volume 750 varies. Accordingly, in the illustrated embodiment the stopper element 752 includes a plurality of outward extending lamella 758. The lamella form grooves therebetween that are capable of absorbing excess ink while facilitating the migration of air from the front of the nib assembly into the reservoir. Examples of markers using such lamella are given in U.S. Pat. Nos. 5,906,446 and 5,420,615, herein incorporated by reference. In other embodiments though, different mechanisms for preventing ink leakage can be employed, as will be appreciated by those of skill in the art, such as those disclosed in U.S. Pat. Nos. 6,095,707 and 6,089,776 to Kaufmann, and U.S. Patent Application 2003/68191 A1 to Hori.

Figure 32:
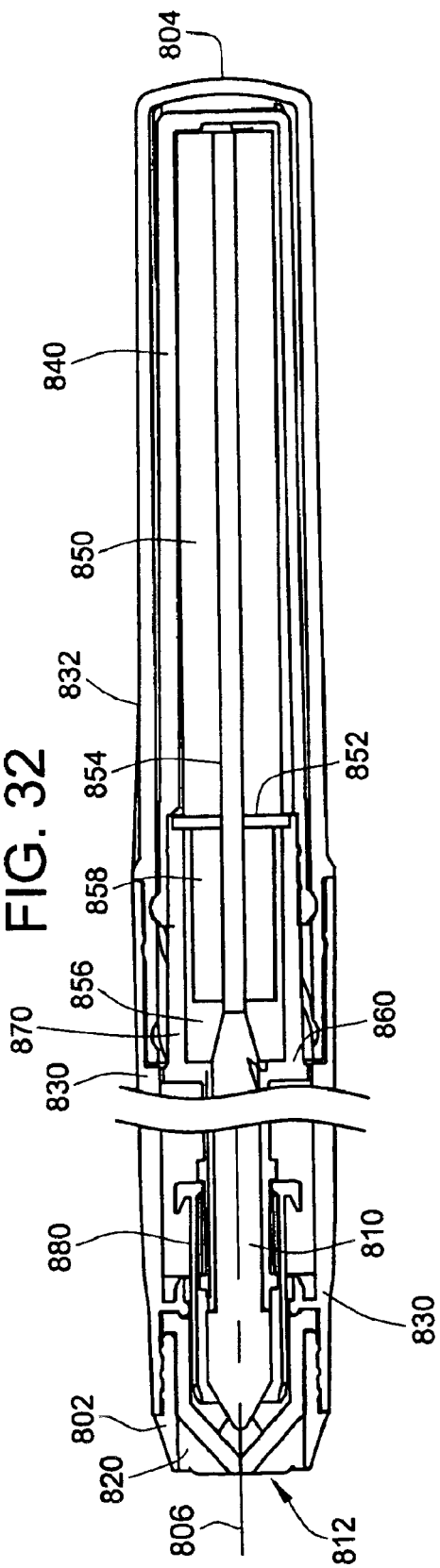
FIG. 32 is a cross-sectional view of an embodiment of a retractable marker designed to incorporate a free-ink system using a chamber and illustrated in the retracted configuration with a valve enclosing the interior volume.

Illustrated in FIG. 32 is an embodiment of a retractable marker 800 incorporating another variation of a free-ink system. The marker 800 includes, for orientation purposes, a front end 802 and an opposing rear end 804. The marker 800 also includes a nib 810 coupled with a nib assembly 870 reciprocally moveable along an axis 806 through an interior volume defined by a front barrel 830 and an adjacent rear barrel 832. For storing the fluid ink, a reservoir volume 850 can be provided as part of the nib assembly 870 by enclosing an inner barrel 840 with a divider disk 852. To provide communication between the nib 810 and the reservoir volume 850, a transfer rod 854 made of a material capable of transferring fluid ink passes through the divider disk 852. an embodiment of a retractable marker designed to incorporate a free-ink system using a divided tube and button for facilitating extension and retraction.

To enable the transfer of ink from the reservoir volume 850 through the transfer rod 854 to the nib, as will be appreciated by those of skill in the art, air or other gas must migrate back into the reservoir volume 850 to prevent a vacuum from forming therein. Typically, the air is provided proximate to the front of the divider disk 852. Preferably, to facilitate this migration, a minor space or gap exists between the transfer rod 854 and the divider disk 852. The gap is preferably sized so that the leakage of ink from the reservoir 850 is prevented by the fluid ink's own inherent surface tension that forms a fluid membrane between the divider disc 852 and the transfer rod 854. However, the gap is preferably large enough to allow for the migration of air molecules across the fluid membrane into the reservoir 850.

To prevent ink from leaking from the marker 800 when the temperature and/or pressure change in the volume reservoir 850, the marker includes a chamber 856. The chamber 856 is formed between the divider disc 852 and a coupling element 860 that retains the nib 810 in the nib assembly 870. Accordingly a portion of the transfer rod 854 traverses the chamber 856 between the divider disc 852 and the nib 810. As will be appreciated by those of skill in the art, if a pressure and/or temperature increase in the reservoir 850 causes ink to break the fluid membrane or be forced through the transfer rod 854, excess ink can bleed into the chamber 856. To store the excess ink, the marker can include in the chamber 856 a capillary storage 858 preferably made from a porous material such as sponge. The capillary storage 858 is located proximate to, preferably surrounding and more preferably contacting the transfer rod 854. In operation, excess ink from the transfer rod 854 and gap between the transfer rod and divider disk will be stored in the capillary storage 858 and, in an embodiment, can be later return to the transfer rod when the pressure and/or temperature in the reservoir volume dissipates.

According to an aspect of the present invention, to prevent the marker 800 from drying when not in use, the nib 810 and nib assembly 870 can reciprocally extend and retract along the axis 806 such that the nib traverses an aperture 812 in the front end 802 of the marker. When in the retracted position, a valve element 820 encloses the aperture to seal the nib 810 from the environment. To facilitate opening of the valve element 820 when extending the nib 810, the marker includes a sleeve 880 engaging the coupling element 860 that can function in any of the above-described manners. In the illustrated embodiment, linear motion of the nib 810 and nib assembly 870 along the axis 806 is achieved by rotating the rear barrel 832 with respect to the front barrel 830.

Figure 33:
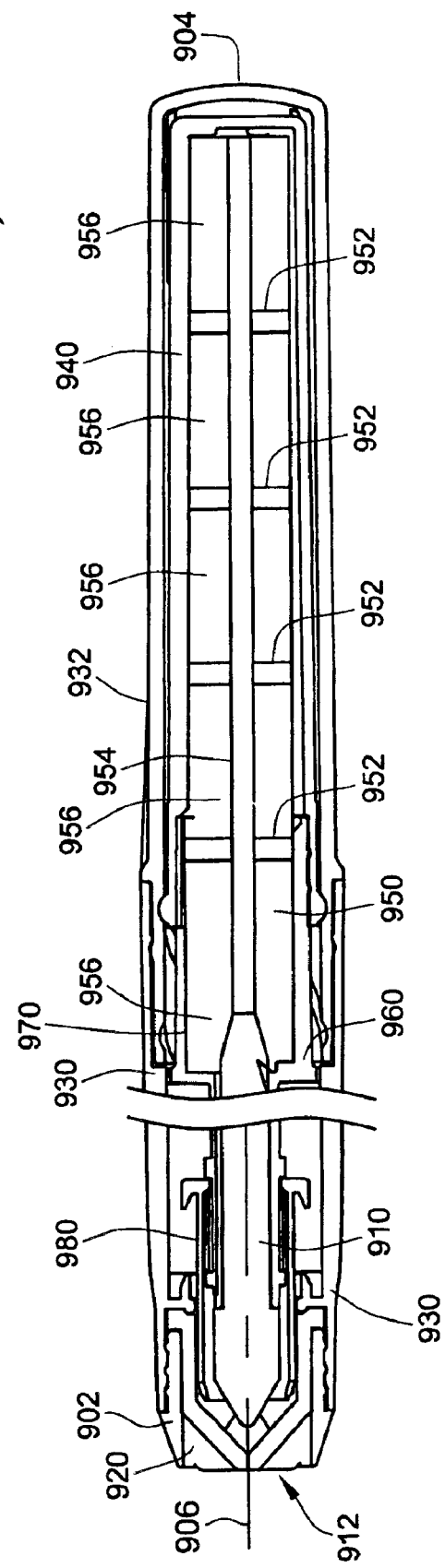
FIG. 33 is a cross-sectional view of an embodiment of a retractable marker designed to incorporate a free-ink system using a divided chamber and illustrated in the retracted configuration with a sliding door enclosing the interior volume.

Illustrated in FIG. 33, is an embodiment of a retractable marker 900 incorporating another variation of a free-ink system. The marker 900 includes, for orientation purposes, a front end 902 and an opposing rear end 904. The marker 900 also includes a nib 910 coupled with a nib assembly 970 reciprocally moveable along an axis 906 through an interior volume defined by a front barrel 930 and an adjacent rear barrel 932. To store the fluid ink, a reservoir volume 950 can be provided as part of the nib assembly 970 by press-fitting a coupling element 960 into an inner barrel 940. To provide communication between the nib 910 and the reservoir volume 950, a transfer rod 954 made of a material capable of transferring fluid ink passes through the reservoir volume.

To stabilize the transfer of ink from the reservoir volume 950 to the nib 910, the reservoir volume is divided by a plurality of axially spaced divider disks 952 through which the transfer rod 954 passes. To allow the necessary air to transfer into the reservoir volume 950 and prevent the formation of a vacuum, preferably a minor space or gap exists between the transfer rod 954 and the divider disks 952. As before, the gap is preferably sized so that the ink forms a fluid membrane and will not leak from the reservoir volume 950 but that air molecules can still migrate into the reservoir volume.

As better described in U.S. patent application Ser. No. 10/283,962, published as US 2003/0068191 A1, dividing the reservoir 950 into multiple chambers 956 by axially spaced divider disks 952 decreases the likelihood ink will leak from the marker. As the pressure and/or temperature increases in any one chamber 956, ink will transfer into an adjoining chamber. However, since only the front-most chamber is in contact with the coupling element 960 and the nib 910, the amount of fluid ink present in this chamber, and accordingly leak, is minimized.

According to an aspect of the present invention, to prevent the marker 900 from drying when not in use, the nib 910 and nib assembly 970 can reciprocally extend and retract along the axis 906 such that the nib traverses an aperture 912 in the front end 902 of the marker. When in the retracted position, a valve element 920 encloses the aperture to seal the nib 910 from the environment. To facilitate opening of the valve element 920 when extending the nib 910, the marker includes a sleeve 980 engaging the coupling element that can function in any of the above-described manners. In the illustrated embodiment, linear motion of the nib 910 and nib assembly 970 along the axis 906 is achieved by rotating the rear barrel 932 with respect to the front barrel 930.

Figure 34:
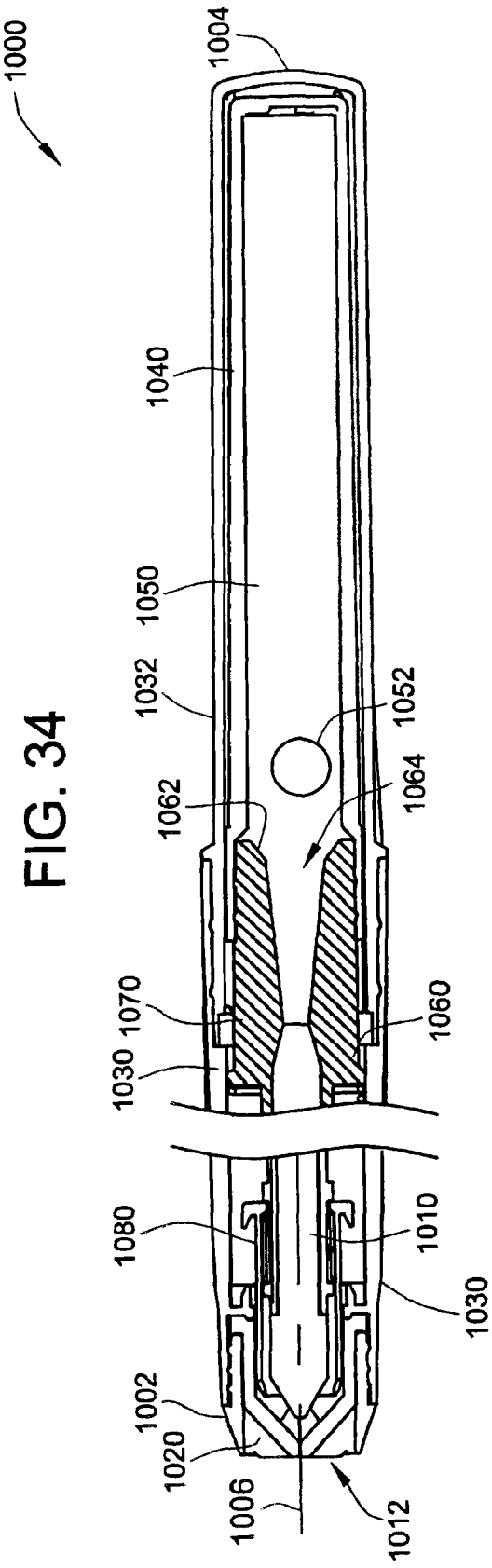
FIG. 34 is a cross-sectional view of an embodiment of a retractable marker designed to incorporate a free-ink system using a valve system and illustrated in the retracted configuration with a valve enclosing the interior volume.

Illustrated in FIG. 34 is another embodiment of a retractable marker 1000 configured to incorporate another variation of the free ink system. The marker 1000 includes, for orientation purposes, a front end 1002 and an opposing rear end 1004. The marker 1000 also includes a nib 1010 coupled with a nib assembly 1070 reciprocally moveable along an axis 1006 through an interior volume defined by a front barrel 1030 and an adjacent rear barrel 1032. To store the fluid ink, a reservoir volume 1050 can be provided as part of the nib assembly 1070 by press-fitting a coupling element 1060 into an inner barrel 1040.

To stabilize the flow of ink from the reservoir 1050 to the nib 1010, a valve system is incorporated to function with the reservoir volume 1050. An example of a valve system used in a marker is given in U.S. Pat. No. 5,967,688, herein incorporated by reference. The valve system includes a valve seat 1062 formed on the rear portion of the coupling element 1060 that is press-fitted into the reservoir volume 1050. A channel 1064 disposed through the valve seat 1062 provides fluid communication between the reservoir volume 1050 and the nib 1010. To regulate the transfer of ink, a ball 1052 preferably made of steel is loosely retained inside the reservoir volume 1050. As will be appreciated, when the marker 1000 is vertically oriented the ball 1052 will engage the valve seat 1062 sealing access to the channel 1064. When the vertical orientation is altered, the ball 1052 will disengage the valve seat 1062 providing communication between the reservoir volume 1050 and the nib 1010 through the channel 1064. Accordingly, ink is only intermittently transferred to the nib 1010.

According to an aspect of the present invention, to prevent the marker 1000 from drying when not in use, the nib 1010 and nib assembly 1070 can reciprocally extend and retract along the axis 1006 such that the nib traverses an aperture 1012 in the front end 1002 of the marker. When in the retracted position, a valve element 1020 encloses the aperture 1012 to seal the nib 1010 from the environment. To facilitate opening of the valve element 1020 when extending the nib 1010, the marker includes a sleeve 1080 engaging the coupling element that can function in any of the above-described manners. In the illustrated embodiment, linear motion of the nib 1010 and nib assembly 1070 along the axis 1060 is achieved by rotating the rear barrel 1032 with respect to the front barrel 1030.

Figure 35:
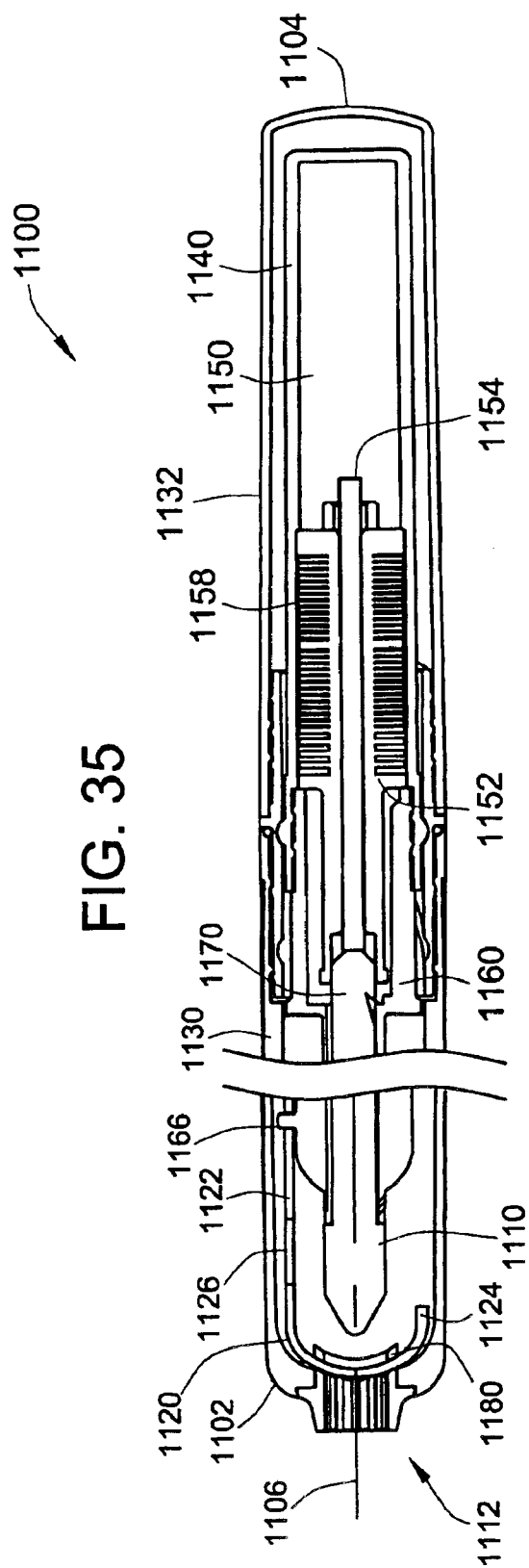
FIG. 35 is a cross-sectional view of an embodiment of a retractable marker designed to incorporate a free-ink system using a lamella and illustrated in the retracted configuration with a sliding door enclosing the interior volume.

Illustrated in FIG. 35 is an embodiment of a retractable marker 1100 incorporating a free ink system and designed to enclose an aperture 1112 with a sliding door 1120. The marker 1000 includes, for orientation purposes, a front end 1102 through which the aperture 1112 is disposed and a rear end 1104. The marker 1100 also includes a nib 1110 coupled with a nib assembly 1170 reciprocally movable along an axis 1106 within an interior volume defined by a front barrel 1130 and an adjacent rear barrel 1132. To store the fluid ink, a reservoir volume 1150 is provided by press-fitting a stopper element 1152 into an inner barrel 1140. To provide communication between the nib 1110 and the reservoir volume 1150, a transfer rod 1154 made of a material capable of transferring fluid ink passes through the stopper element 1152 between the reservoir volume and the nib.

As will be appreciated by those of skill in the art, to enable transfer of ink from the reservoir volume 1150 to the nib 1110, air must be able to bleed back into the reservoir volume and thereby prevent a vacuum from forming. Furthermore, the marker 1110 must be designed to prevent ink from leaking through the stopper element 1152 as the pressure and temperature inside the reservoir volume 1150 varies. Accordingly, in the illustrated embodiment the stopper element 1152 includes a plurality of outward extending lamella 1158. The lamella 1158 form grooves therebetween that are capable of absorbing excess ink while facilitating the migration of air from the front of the nib assembly into the reservoir.

In accordance with an aspect of the present invention, to prevent the marker 1100 from drying when not in use, the nib 1110 and nib assembly 1170 can reciprocally extend and retract along the axis 1106 such that the nib traverses an aperture 1112 in the front end 1102 of the marker. As described above, the sliding door 1120 facilitates sealing the retracted nib 1110 from the environment. The sliding door 1120 is formed from thin, flexible material and includes a top end 1122 and a bottom end 1124. The sliding door 1120 curves about the interior of the front end 1102 such that the bottom end 1124 is generally perpendicular to the axis 1106 and overlays the aperture 1112. Accordingly, in this configuration, the top end 1122 is parallel to the axis 1106.

To provide access so the extended nib 1110 can traverse the aperture 1112, the sliding door 1120 includes a slot 1126 formed between the top and bottom ends 1122, 1124. Moreover, the top end 1122 engages a protrusion 1166 extending from the coupling element 1160 included as part of the nib assembly 1170. As will be appreciated, as the nib assembly 1170 is extended forward, the slot is moved perpendicular to the axis and aligned with the aperture 1112. Accordingly, the nib traverses both the slot and aperture. To facilitate movement of the sliding door 1120, a slide guide 1180 can be included on the interior of the front end 1102. In the illustrated embodiment, linear motion of the nib 1110 and nib assembly 1170 along the axis 1106 and movement of the sliding door 1120 is achieved by rotating the rear barrel 1132 with respect to the front barrel 1130. It will be appreciated by those of skill in the art that linear motion can also be achieved by depressing a button as described with respect to FIG. 28.

Figure 36:
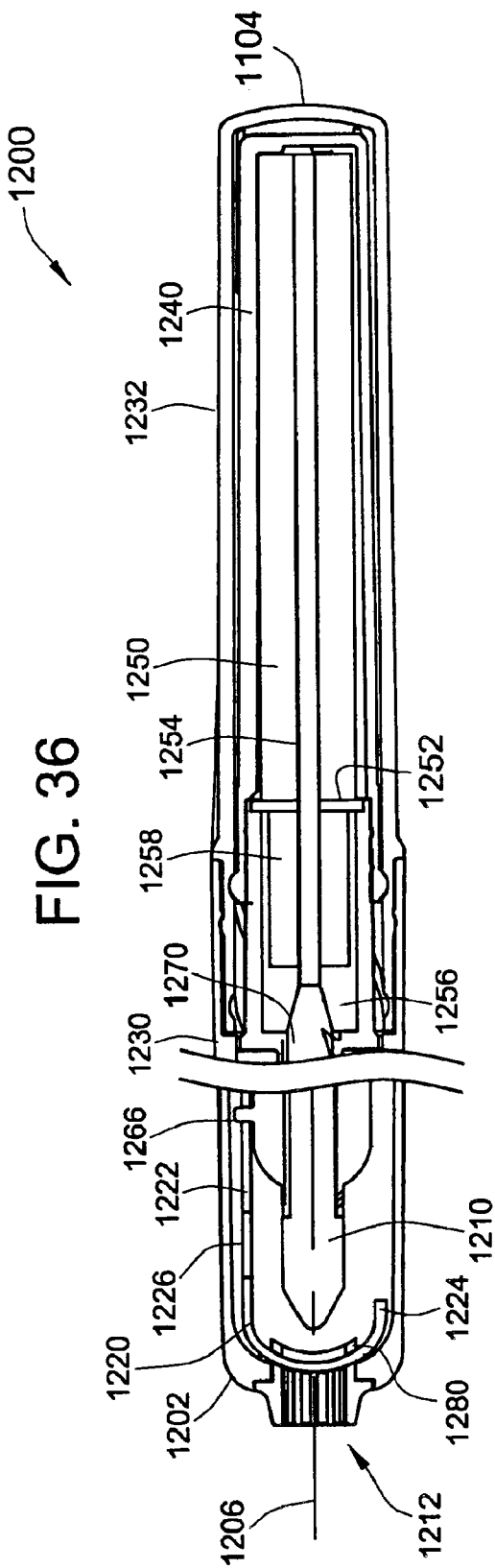
FIG. 36 is a cross-sectional view of an embodiment of a retractable marker designed to incorporate a free-ink system using a chamber and illustrated in the retracted configuration with a sliding door enclosing the interior volume.

Illustrated in FIG. 36 is another embodiment of retractable marker 1200 incorporating a free ink system and designed to enclose an aperture 1212 with a sliding door 1220. The marker 1200 includes, for orientation purposes, a front end 1202 through which the aperture 1212 is disposed and a rear end 1204. The marker 1200 also includes a nib 1210 coupled with a nib assembly 1270 reciprocally movable along an axis 1206 within an interior volume defined by a front barrel 1230 and an adjacent rear barrel 1232. To store the fluid ink, a reservoir volume 1250 is provided by enclosing an inner barrel 1240 with a divider disk 1252. To provide communication between the nib 1210 and the reservoir volume 1250, a transfer rod 1254 made of a material capable of transferring fluid ink passes through the divider disk 1252 between the reservoir and the nib.

To enable the transfer of ink from the reservoir volume 1250 through the transfer rod 1254 to the nib 1210, as will be appreciated by those of skill in the art, air or other gas must migrate back into the reservoir volume 1250 to prevent a vacuum from forming therein. Typically, the air is provided proximate to the front of the divider disk 1252. Preferably, to facilitate this, a minor space or gap exists between the transfer rod 1254 and the divider disk 1252. The gap is preferably sized so that the leakage of ink from the reservoir 1250 is prevented by the fluid ink's own inherent surface tension that forms a fluid membrane between the divider disc 1252 and the transfer rod 1254. However, the gap is preferably large enough to allow for the migration of air molecules across the fluid membrane into the reservoir 1250.

To prevent ink from leaking from the marker 1200 when the temperature and/or pressure changes in the volume reservoir 1250, the marker includes a chamber 1256. The chamber 1256 is formed between the divider disc 1252 and a coupling element 1260 that retains the nib 1210. Accordingly a portion of the transfer rod 1254 traverses the chamber 1256 between the divider disc 1252 and the nib 1210. As will be appreciated by those of skill in the art, if a pressure and/or temperature increase in the reservoir volume 1250 causes ink to break the fluid membrane or be forced through the transfer rod 1254, excess ink can bleed into the chamber 1256. To store the excess ink, the marker can include in the chamber 1256 a capillary storage 1258 preferably made from a porous material such as sponge. The capillary storage is located proximate to, preferably surrounding and more preferably contacting the transfer rod 1254. In operation, excess ink from the transfer rod 1254 and the gap between the transfer rod and divider disk will be stored in the capillary storage 1258 and, in an embodiment, can be later return to the transfer rod when the pressure and/or temperature in the reservoir dissipates.

In accordance with an aspect of the present invention, to prevent the marker 1200 from drying when not in use, the nib 1210 and nib assembly 1270 can reciprocally extend and retract along the axis 1206 such that the nib traverses an aperture 1212 in the front end 1202 of the marker 1200. As described above, the sliding door 1220 facilitates sealing the retracted nib 1210 from the environment. The sliding door 1220 is formed from thin, flexible material and includes a top end 1222 and a bottom end 1224. The sliding door 1220 curves about the interior of the front end 1202 such that the bottom end 1224 is perpendicular to the axis 1206 and overlays the aperture 1212. Accordingly, in this configuration, the top end 1222 is parallel to the axis 1206.

To provide access so the extended nib 1210 can traverse the aperture 1212, the sliding door 1220 includes a slot 1226 formed between the top and bottom ends 1222, 1224. Moreover, the top end 1222 engages a protrusion 1266 extending from the coupling element 1260 included as part of the nib assembly 1270. As will be appreciated, as the nib assembly 1270 is extended forward, the slot 1226 is moved perpendicular to the axis 1206 and aligned with the aperture 1212. Accordingly, the nib traverses both the slot and aperture. To facilitate movement of the sliding door 1220, a slide guide 1280 can be included on the interior of the front end 1202. In the illustrated embodiment, linear motion of the nib 1210 and nib assembly 1270 along the axis 1206 and movement of the sliding door 1220 is achieved by rotating the rear barrel 1232 with respect to the front barrel 1230. It will be appreciated by those of skill in the art that linear motion can also be achieved by depressing a button as described with respect to FIG. 28.

Figure 37:
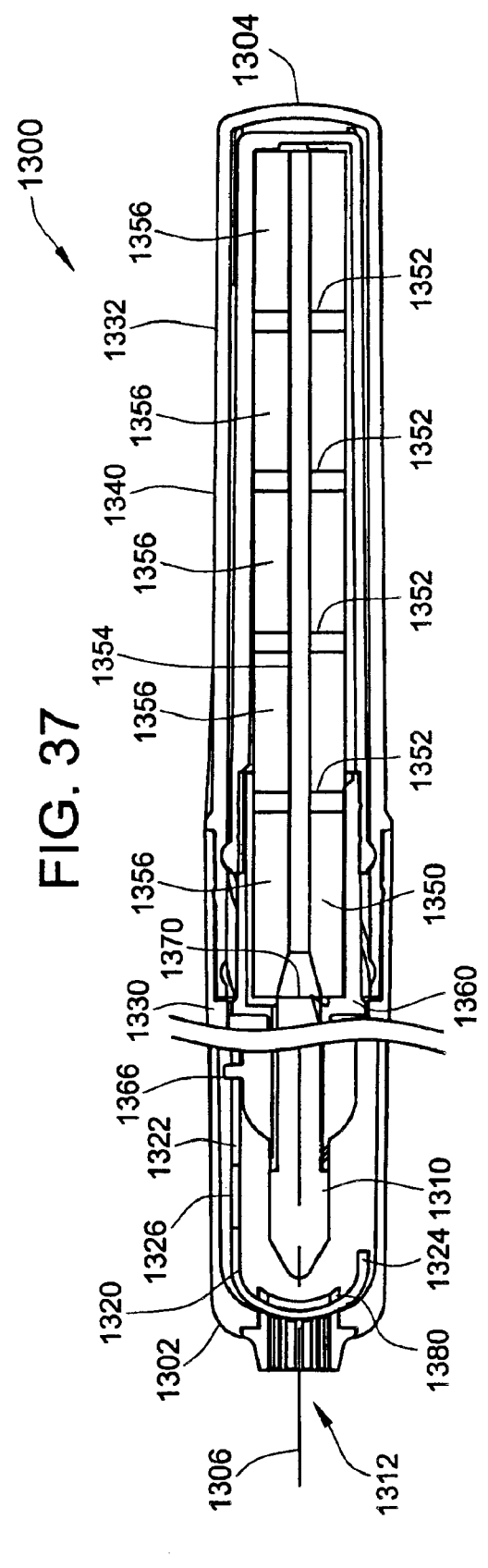

Illustrated in FIG. 37, is an embodiment of a retractable marker 1300 incorporating a variation of a free-ink system and designed to enclose an aperture 1312 with a sliding door 1320. The marker 1300 includes, for orientation purposes, a front end 1302 through which the aperture 1312 is disposed and an opposing rear end 1304. The marker 1300 also includes a nib 1310 coupled with a nib assembly 1370 reciprocally moveable along an axis 1306 through an interior volume defined by a front barrel 1330 and an adjacent rear barrel 1332. To store the fluid ink, a reservoir volume 1350 can be provided as part of the nib assembly 1370 by press-fitting a coupling element 1360 into an inner barrel 1340. To provide communication between the nib 1310 and the reservoir volume 1350, a transfer rod 1354 made of a material capable of transferring fluid ink passes through the reservoir volume.

To stabilize the transfer of ink from the reservoir volume 1350 to the nib 1310, the reservoir volume is divided by a plurality of axially spaced divider disks 1352 through which the transfer rod passes. To allow the required air to transfer into the reservoir and prevent the formation of a vacuum, preferably a minor space or gap exists between the transfer rod 1354 and the divider disks 1352. As before, the gap is preferably sized so that the ink forms a fluid membrane and will not leak from the reservoir 1350 but that air molecules can still migrate into the reservoir volume.

As described above, dividing the reservoir 1350 into multiple chambers 1356 by axially spaced divider disks 1352 decreases the likelihood ink will leak from the marker. As the pressure and/or temperature increases in any one chamber 1356, ink will transfer into an adjoining chamber. However, since only the front-most chamber is in contact with the coupling element 1360 and the nib 1310, the amount of fluid ink present in this chamber, and can thus leak, is minimized.

In accordance with an aspect of the present invention, to prevent the marker 1300 from drying when not in use, the nib 1310 and nib assembly 1370 can reciprocally extend and retract along the axis 1306 such that the nib traverses the aperture 1312. As described above, the sliding door 1320 facilitates sealing the retracted nib 1310 from the environment. The sliding door 1320 is formed from thin, flexible material and includes a top end 1322 and a bottom end 1324. The sliding door 1320 curves about the interior of the front end 1302 such that the bottom end 1324 is perpendicular to the axis 1306 and overlays the aperture 1312. Accordingly, in this configuration, the top end 1322 is parallel to the axis 1306.

To provide access so the extended nib 1310 can traverse the aperture 1312, the sliding door 1320 includes a slot 1226 formed between the top and bottom ends 1222, 1224. Moreover, the top end 1222 engages a protrusion 1366 extending from the coupling element 1360 included as part of the nib assembly 1370. As will be appreciated, as the nib assembly 1370 is extended forward, the slot 1326 is moved perpendicular to the axis 1306 and aligned with the aperture 1312. Accordingly, the nib traverses both the slot and aperture. To facilitate movement of the sliding door 1320, a slide guide 1380 can be included on the interior of the front end 1302. In the illustrated embodiment, linear motion of the nib 1310 and nib assembly 1370 along the axis 1306 and movement of the sliding door 1320 is achieved by rotating the rear barrel 1332 with respect to the front barrel 1330. It will be appreciated by those of skill in the art that linear motion can also be achieved by depressing a button as described with respect to FIG. 28.

Figure 38:
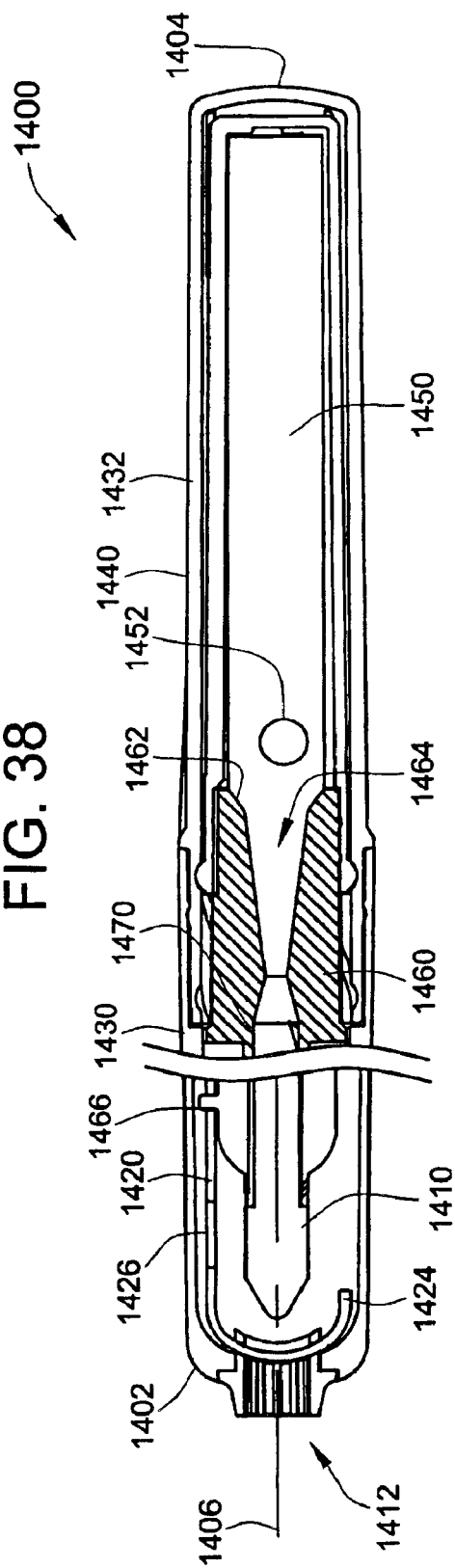
FIG. 38 is a cross-sectional view of an embodiment of a retractable marker designed to incorporate a free-ink system using a valve system and illustrated in the retracted configuration with a sliding door enclosing the interior volume.

Illustrated in FIG. 38 is another embodiment of a retractable marker 1400 incorporating a variation of the free ink system and designed to enclose an aperture 1420 with a sliding door 1420. The marker 1400 includes, for orientation purposes, a front end 1402 and an opposing rear end 1404. The marker 1400 also includes a nib 1410 coupled with a nib assembly 1470 reciprocally moveable along an axis 1406 through an interior volume defined by a front barrel 1430 and an adjacent rear barrel 1432. To store the fluid ink, a reservoir volume 1450 can be provided as part of the nib assembly 1470 by press-fitting a coupling element 1460 into an inner barrel 1440.

To stabilize the flow of ink from the reservoir volume 1450 to the nib 1410, a valve system is incorporated to function with the reservoir volume. The valve system includes a valve seat 1462 formed on the rear portion of the coupling element 1460 that is press-fitted into the reservoir volume 1450. A channel 1464 disposed through the valve seat 1462 provides fluid communication between the reservoir volume 1450 and the nib 1410. To regulate the transfer of ink, a ball 1452 preferably made of steel is loosely retained inside the reservoir volume 1450. As will be appreciated, when the marker 1400 is vertically oriented the ball 1452 will engage the valve seat 1462 sealing access to the channel 1464. When the vertical orientation is altered, the ball 1452 will disengage the valve seat 1462 providing communication between the reservoir volume 1450 and the nib 1410 through the channel 1464. Accordingly, ink is only intermittently transferred to the nib 1410.

In accordance with an aspect of the present invention, to prevent the marker 1400 from drying when not in use, the nib 1410 and nib assembly 1470 can reciprocally extend and retract along the axis 1406 such that the nib traverses the aperture 1412. As described above, the sliding door 1420 facilitates sealing the retracted nib 1410 from the environment. The sliding door 1420 is formed from thin, flexible material and includes a top end 1422 and a bottom end 1424. The sliding door 1420 curves about the interior of the front end 1402 such that the bottom end 1424 is perpendicular to the axis 1406 and overlays the aperture 1412. Accordingly, in this configuration, the top end 1422 is parallel to the axis 1406.

To provide access so the extended nib 1410 can traverse the aperture 1412, the sliding door 1420 includes a slot 1426 formed between the top and bottom ends 1422, 1424. Moreover, the top end 1422 engages a protrusion 1466 extending from the coupling element 1460 included as part of the nib assembly 1470. As will be appreciated, as the nib assembly 1470 is extended forward, the slot 1426 is moved perpendicular to the axis 1406 and aligned with the aperture 1412. Accordingly, the nib traverses both the slot and aperture. To facilitate movement of the sliding door 1420, a slide guide 1480 can be included on the interior of the front end 1402. In the illustrated embodiment, linear motion of the nib 1410 and nib assembly 1470 along the axis 1406 and movement of the sliding door 1420 is achieved by rotating the rear barrel 1432 with respect to the front barrel 1430. It will be appreciated by those of skill in the art that linear motion can also be achieved by depressing a button as described with respect to FIG. 28.

Figure 39:
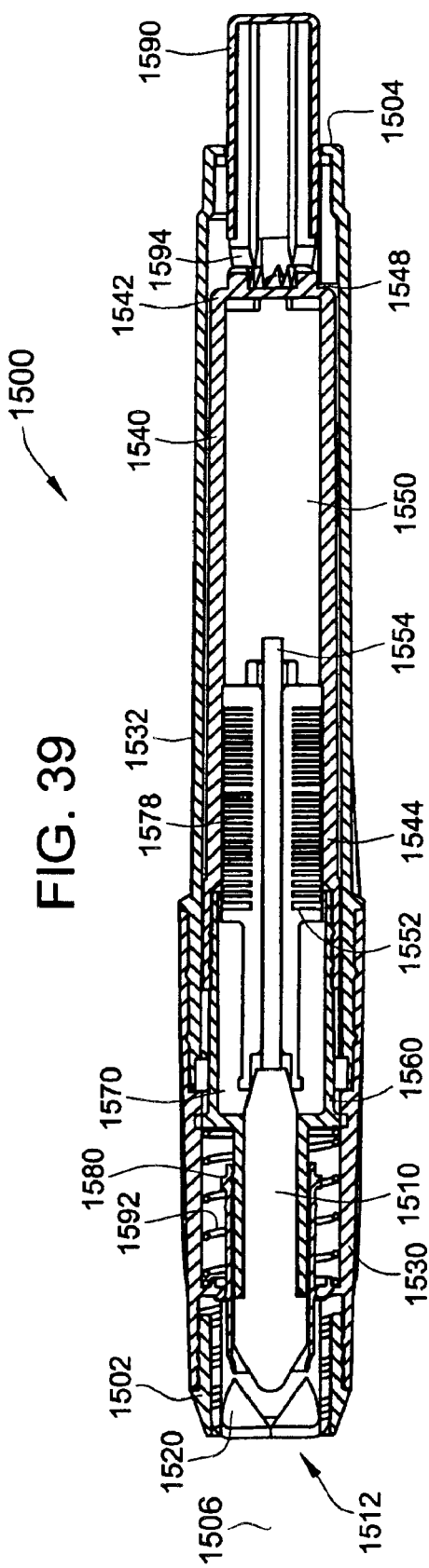
FIG. 39 is a cross-sectional view of an embodiment of a retractable marker designed to incorporate a free-ink system using a lamella and a button for button for facilitating extension and retraction.

Illustrated in FIG. 39 is another embodiment of a retractable marker 1500 incorporating a variation of the free ink system and designed so that linear movement between the extended and retracted configurations is accomplished by depressing a button 1590. The marker 1500 includes, for orientation purposes, a rear end 1504 from which the button 1590 extends and a front end 1502 through which an aperture 1512 is disposed. The marker 1500 also includes a nib 1510 coupled with a nib assembly 1570 reciprocally movable along an axis 1506 within an interior volume defined by a front barrel 1530 and an adjacent rear barrel 1532. To store the fluid ink, an reservoir volume 1550 is provided by press-fitting a stopper element 1552 into an inner barrel 1540. To provide communication between the nib 1510 and the reservoir volume 1550, a transfer rod 1554 made of a material capable of transferring fluid ink passes through the stopper element 1552 between the reservoir volume and the nib.

As will be appreciated by those of skill in the art, to enable transfer of ink from the reservoir volume 1550 to the nib 1510, air must be able to bleed back into the reservoir volume and thereby prevent a vacuum from forming. Furthermore, the marker 1500 must be designed to prevent ink from leaking through the stopper element 1552 as the pressure and temperature inside the reservoir volume 1550 varies. Accordingly, in the illustrated embodiment the stopper element 1552 includes a plurality of outward extending lamella 1558. The lamella 1558 form grooves therebetween that are capable of absorbing excess ink while facilitating the migration of air from the front of the nib assembly into the reservoir volume 1550.

In accordance with an aspect of the present invention, depressing the button 1590 alternatively extends and retracts the nib 1510 through the aperture 1512. As described above, the button 1590 engages the closed end 1542 of the rear barrel 1540. The opened end 1544 of the inner barrel includes a protrusion that is coextensive with a plurality of slots and ridges formed on the inner surface of the outer barrel 1532 parallel with the axis 1506. Also included is a spring 1592 that baises the nib assembly 1570 rearward. As will be appreciated, depressing the button 1590 alters alignment of the protrusion with a slot or ridge resulting in the extension and retraction of the nib assembly 1570 along the axis 1506. To facilitate altering alignment, the button includes a crown of teeth 1594 that engage a similar crown of teeth 1548 included on the closed end 1542 of the inner barrel 1540.

In accordance with another aspect of the present invention, to seal the retracted nib 1510 from the environment for preventing drying of the marker 1500, a valve element 1520 encloses the aperture 1512. To open the valve element 1520 so that the nib 1510 can traverse the aperture 1512, a sleeve 1580 engages the coupling element 1570 and protectively surrounds the nib. The sleeve 1580 can function in any of the above described manners.

Figure 40:
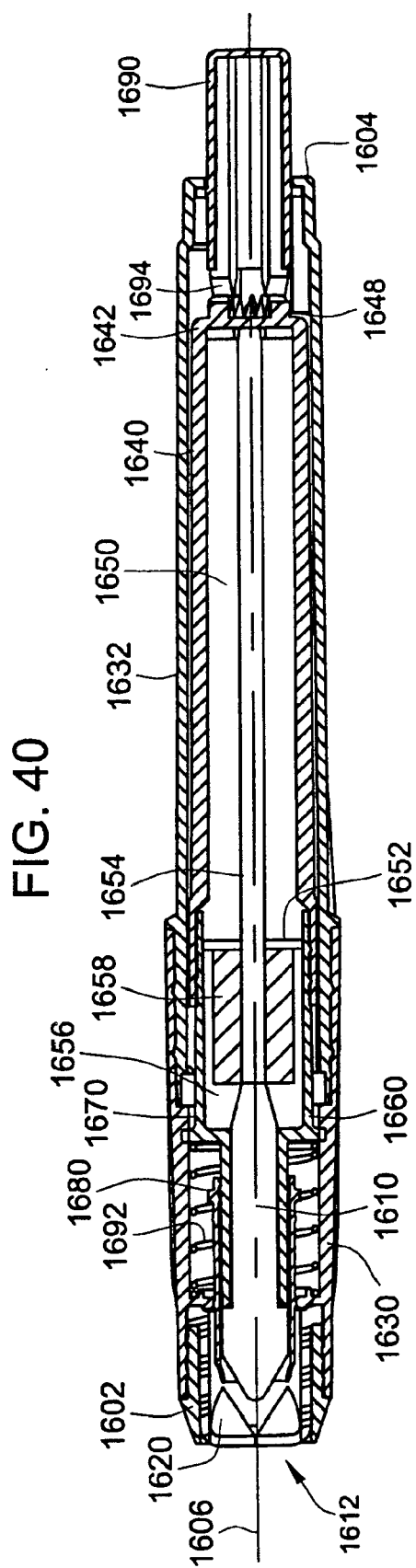
FIG. 40 is a cross-sectional view of an embodiment of a retractable marker designed to incorporate a free-ink system using a chamber and button for facilitating extension and retraction.

Illustrated in FIG. 40 is another embodiment of a retractable marker 1600 incorporating a variation of the free ink system and designed so that linear movement between the extended and retracted configurations is accomplished by depressing a button 1690. The marker 1600 includes, for orientation purposes, a rear end 1604 from which the button 1690 extends and a front end 1602 through which an aperture 1612 is disposed. The marker 1600 also includes a nib 1610 coupled with a nib assembly 1670 reciprocally movable along an axis 1606 within an interior volume defined by a front barrel 1630 and an adjacent rear barrel 1632. To store the fluid ink, a reservoir volume 1650 is provided by enclosing an inner barrel 1640 with a divider disk 1652. To provide communication between the nib 1610 and the reservoir volume 1650, a transfer rod 1654 made of a material capable of transferring fluid ink passes through the divider disk 1652 between the reservoir and the nib.

To enable the transfer of ink from the reservoir volume 1650 through the transfer rod 1654 to the nib 1610, as will be appreciated by those of skill in the art, air or other gas must migrate back into the reservoir volume 1650 to prevent a vacuum from forming therein. Typically, the air is provided proximate to the front of the divider disk 1652. Preferably, to facilitate this, a minor space or gap exists between the transfer rod 1654 and the divider disk 1652. The gap is preferably size so that the leakage of ink from the reservoir 1650 is prevented by the fluid ink's own inherent surface tension that forms a fluid membrane between the divider disc 1652 and the transfer rod 1654. However, the gap is preferably large enough to allow for the migration of air molecules across the fluid membrane into the reservoir 1650.

To prevent ink from leaking from the marker 1600 when the temperature and/or pressure change in the volume reservoir 1650, the marker includes a chamber 1656. The chamber 1656 is formed between the divider disc 1652 and a coupling element 1660 that retains the nib 1610. Accordingly a portion of the transfer rod 1654 traverses the chamber 1656 between the divider disc 1652 and the nib 1610. As will be appreciated by those of skill in the art, if a pressure and/or temperature increase in the reservoir volume 1650 causes ink to break the fluid membrane or be forced through the transfer rod 1654, excess ink can bleed into the chamber 1656. To store the excess ink, the marker can include in the chamber 1656 a capillary storage 1658 preferably made from a porous material. The capillary storage 1658 is located proximate to, preferably surrounding and more preferably contacting the transfer rod 1654. In operation, excess ink bleeding from the transfer rod 1654 will be stored in the capillary storage 1658 and, in an embodiment, can be later return to the transfer rod when the pressure and/or temperature in the reservoir dissipates.

In accordance with an aspect of the present invention, depressing the button 1690 alternatively extends and retracts the nib 1610 through the aperture 1612. As described above, the button 1690 engages the closed end 1642 of the rear barrel 1640. The opened end 1644 of the inner barrel includes a protrusion that is coextensive with a plurality of slots and ridges formed on the inner surface of the outer barrel 1632 parallel with the axis 1606. Also included is a spring 1692 that baises the nib assembly 1670 rearward. As will be appreciated, depressing the button 1690 alters alignment of the protrusion with a slot or ridge resulting in the extension and retraction of the nib assembly 1670 along the axis 1606. To facilitate altering alignment, the button includes a crown of teeth 1694 that engage a similar crown of teeth 1648 included on the closed end 1642 of the inner barrel 1640.

In accordance with another aspect of the present invention, to seal the retracted nib 1610 from the environment for preventing drying of the marker 1600, a valve element 1620 encloses the aperture 1612. To open the valve element 1620 so that the nib 1610 can traverse the aperture 1612, a sleeve 1680 engages the coupling element 1670 and protectively surrounds the nib. The sleeve 1680 can function in any of the above-described manners.

Figure 41:
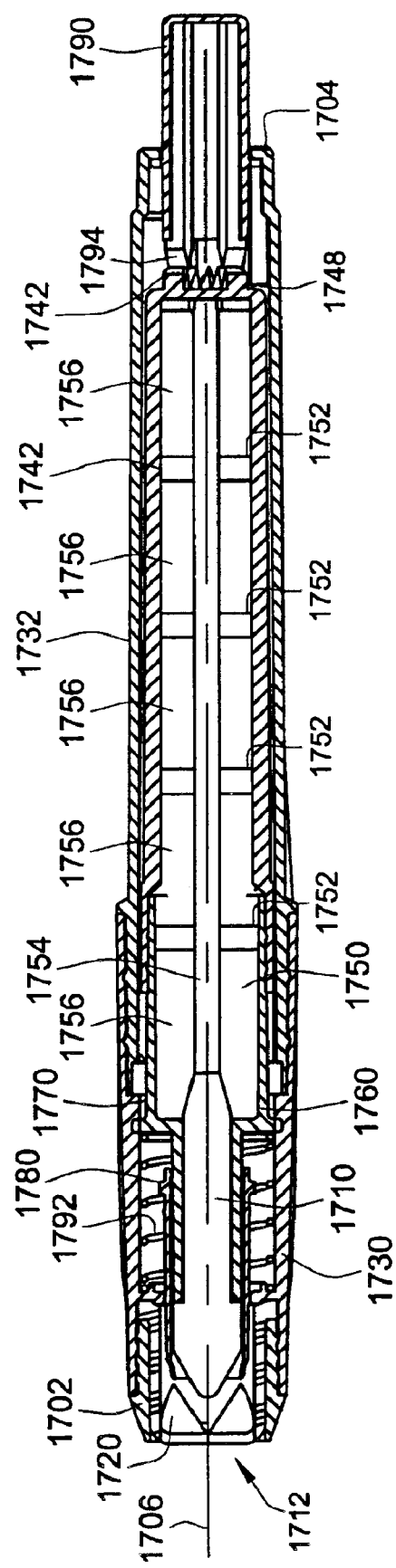
FIG. 41 is a cross-sectional view of an embodiment of a retractable marker designed to incorporate a free-ink system using a divided chambers and button for facilitating extension and retraction.

Illustrated in FIG. 41 is another embodiment of a retractable marker 1700 incorporating a variation of the free ink system and designed so that linear movement between the extended and retracted configurations is accomplished by depressing a button 1790. The marker 1700 includes, for orientation purposes, a rear end 1704 from which the button 1790 extends and a front end 1702 through which an aperture 1712 is disposed. The marker 1700 also includes a nib 1710 coupled with a nib assembly 1770 reciprocally movable along an axis 1706 within an interior volume defined by a front barrel 1730 and an adjacent rear barrel 1732. To store the fluid ink, a reservoir volume 1750 can be provided as part of the nib assembly 1770 by press-fitting a coupling element 1760 into an inner barrel 1740. To provide communication between the nib 1710 and the reservoir volume 1750, a transfer rod 1754 made of a material capable of transferring fluid ink passes through the reservoir volume.

To stabilize the transfer of ink from the reservoir volume 1750 to the nib 1710, the reservoir volume is divided by a plurality of axially spaced divider disks 1752 through which the transfer rod. To allow the required air to transfer into the reservoir volume and prevent the formation of a vacuum, preferably a minor space or gap exists between the transfer rod 1754 and the divider disks 1752. As before, the gap is preferably sized so that the ink forms a fluid membrane and will not leak from the reservoir 1750 but that air molecules can still migrate into the reservoir volume.

As described above, dividing the reservoir 1750 into multiple chambers 1756 by axially spaced divider disks 1752 decreases the likelihood ink will leak from the marker. As the pressure and/or temperature increase in any one chamber 1756, ink will transfer into an adjoining chamber. However, since only the front-most chamber is in contact with the coupling element 1760 and the nib 1710, the amount of fluid ink present in this chamber, and accordingly leak, is minimized.

In accordance with an aspect of the present invention, depressing the button 1790 alternatively extends and retracts the nib 1710 through the aperture 1712. As described above, the button 1790 engages the closed end 1742 of the rear barrel 1740. The opened end 1744 of the inner barrel includes a protrusion that is coextensive with a plurality of slots and ridges formed on the inner surface of the outer barrel 1732 parallel with the axis 1706. Also included is a spring 1792 that biases the nib assembly 1770 rearward. As will be appreciated, depressing the button 1790 alters alignment of the protrusion with a slot or ridge resulting in the extension and retraction of the nib assembly 1770 along the axis 1706. To facilitate altering alignment, the button includes a crown of teeth 1794 that engage a similar crown of teeth 1748 included on the closed end 1742 of the inner barrel 1740.

In accordance with another aspect of the present invention, to seal the retracted nib 1710 from the environment for preventing drying of the marker 1700, a valve element 1720 encloses the aperture 1712. To open the valve element 1720 so that the nib 1710 can traverse the aperture 1712, a sleeve 1780 engages the coupling element 1760 and protectively surrounds the nib. The sleeve 1780 can function in any of the above-described manners.

Illustrated in FIG. 42 is another embodiment of a retractable marker 1800 incorporating a variation of the free ink system and designed so that linear movement between the extended and retracted configurations is accomplished by depressing a button 1890. The marker 1800 includes, for orientation purposes, a rear end 1804 from which the button 1800 extends and a front end 1802 through which an aperture 1812 is disposed. The marker 1800 also includes a nib 1810 coupled with a nib assembly 1870 reciprocally movable along an axis 1806 within an interior volume defined by a front barrel 1830 and an adjacent rear barrel 1832. To store the fluid ink, a reservoir volume 1850 can be provided as part of the nib assembly 1870 by press-fitting a coupling element 1860 into an inner barrel 1840.

To stabilize the flow of ink from the reservoir volume 1850 to the nib 1810, a valve system is incorporated to function with the reservoir volume. The valve system includes a valve seat 1862 formed on the rear portion of the coupling element 1860 that is press-fitted into the reservoir volume 1850. A channel 1864 disposed through the valve seat 1862 provides fluid communication between the reservoir volume 1850 and the nib 1810. To regulate the transfer of ink, a ball 1852 preferably made of steel is loosely retained inside the reservoir volume 1850. As will be appreciated, when the marker 1800 is vertically oriented the ball 1852 will engage the valve seat 1862 sealing access to the channel 1864. When the vertical orientation is altered, the ball 1852 will disengage the valve seat 1862 providing communication between the reservoir volume 1850 and the nib 1810 through the channel 1864. Accordingly, ink is only intermittently transferred to the nib 1810.

In accordance with an aspect of the present invention, depressing the button 1890 alternatively extends and retracts the nib 1810 through the aperture 1812. As described above, the button 1890 engages the closed end 1842 of the rear barrel 1840. The opened end 1744 of the inner barrel includes a protrusion that is coextensive with a plurality of slots and ridges formed on the inner surface of the outer barrel 1832 parallel with the axis 1806. Also included is a spring 1892 that biases the nib assembly 1870 rearward. As will be appreciated, depressing the button 1890 alters alignment of the protrusion with a slot or ridge resulting in the extension and retraction of the nib assembly 1870 along the axis 1806. To facilitate altering alignment, the button includes a crown of teeth 1894 that engage a similar crown of teeth 1848 included on the closed end 1842 of the inner barrel 1840.

In accordance with another aspect of the present invention, to seal the retracted nib 1810 from the environment for preventing drying of the marker 1800, a valve element 1820 encloses the aperture 1812. To open the valve element 1820 so that the nib 1810 can traverse the aperture 1812, a sleeve 1880 engages the coupling element 1860 and protectively surrounds the nib. The sleeve 1880 can function in any of the above-described manners.

Thus, the present invention provides a retractable writing instrument designed to deliver fluid ink to a writing surface. The writing instrument includes an elongated body and a nib for transferring the ink to the writing surface. The nib can move with respect to the body traversing an aperture between an extended configuration for writing and a retracted configuration when not in use. To prevent the writing instrument from drying out when not in use, a sealing element is positioned proximate that aperture that encloses the retracted nib. To prevent transfer of ink from the nib to the sealing element, the sealing element is designed to open and closes without directly contacting the nib.

The embodiments that incorporate a valve element to enclose the aperture may be used with any ink delivery system, such as the delivery systems noted above, and with any linear motion mechanism, such as the twist mechanism or the push button mechanism noted above. Similarly, the embodiments that incorporate a sliding door to enclose the aperture may be used with any ink delivery system, such as the delivery systems noted above, and with any linear motion mechanism, such as the twist mechanism or the push button mechanism noted above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments would become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A writing instrument configurable between a retracted configuration and an extended configuration, the writing instrument comprising:

a body defining an interior volume and an axis, the interior volume accessible through an aperture, the axis passing through the aperture;

a nib assembly including a nib, a reservoir for retaining ink, and a coupling element for coupling the nib to the reservoir, the nib assembly located inside the body and reciprocally movable along the axis;

a sliding door including an upper end, a lower end, and a slot disposed through the sliding door between the upper end and the lower end, the upper end attached to the coupling element;

whereby, when the nib assembly is moved to the retracted configuration, the lower end of the sliding door overlays the aperture; and whereby when the nib assembly is moved to the extended configuration, the slot of the sliding door overlays the aperture and the nib traverses the slot and the aperture.

2. The writing instrument of claim 1, wherein when in the retracted position, the slot is parallel to the axis.

3. The writing instrument of claim 2, wherein when in the extended position, the slot is perpendicular to the axis.

4. The writing instrument of claim 1, wherein the body includes a front end, the aperture disposed through the front end.

5. The writing instrument of claim 4 wherein a nozzle is connected to the front end of the body.

6. The writing instrument of claim 4, further comprising a slide guide located inside the body and offset from the front end to create a gap, the sliding door passing through the gap.

7. The writing instrument of claim 6 wherein the sliding door has a lower end and an upper end, the lower end has a first thickness, the upper end has a second thickness, the first thickness is greater than the second thickness.

8. The writing instrument of claim 7 wherein when the lower end is located in the gap, the lower end wedges in the gap.

9. The writing instrument of claim 6 further comprising a second slide guide.

10. The writing instrument of claim 1, wherein the body includes a front barrel and a rear barrel aligned about the axis, the front barrel and the rear barrel rotatable with respect to each other.

11. The writing instrument of claim 10 further comprising an intermediate collet, the collet connected to the rear barrel.

12. The writing instrument of claim 10 wherein the rear barrel includes a helical thread, the nib assembly includes a protrusion, the protrusion engages the helical thread.

13. The writing instrument of claim 10, wherein the rear barrel includes a forward opened end and a rearward closed end, and a helical thread formed proximate the opened end and extending toward the closed end, the helical thread having a locking notch proximate the opened end.

14. The writing instrument of claim 13, wherein the nib assembly includes a protrusion, the protrusion engaging the helical thread formed in the rear barrel.

15. The writing instrument of claim 14, wherein when in the extended configuration, the protrusion engages the locking notch.

16. The writing instrument of claim 1 wherein the reservoir is a reservoir cylinder.

17. The writing instrument of claim 16 wherein the reservoir cylinder includes a porous material.

18. The writing instrument of claim 16 wherein the reservoir cylinder includes a fibrous material.

19. The writing instrument of claim 1 further comprising a transfer rod.

20. The writing instrument of claim 19 wherein the transfer rod is in fluid communication with the nib.

21. The writing instrument of claim 19 further comprising a stopper element.

22. The writing instrument of claim 21 wherein the transfer rod passes through the stopper element.

23. The writing instrument of claim 21 wherein the stopper element includes a plurality of lamella.

24. The writing instrument of claim 23 wherein the lamella form grooves.

25. The writing instrument of claim 24 wherein the grooves are capable of absorbing excess ink.

26. The writing instrument of claim 19 further comprising a divider disk.

27. The writing instrument of claim 26 further comprising a second divider disk.

28. The writing instrument of claim 26 wherein the transfer rod passes through the divider disk.

29. The writing instrument of claim 28 wherein a space is located between the transfer rod and the divider disk.

30. The writing instrument of claim 19 further comprising capillary storage.

31. The writing instrument of claim 30 wherein the capillary storage is positioned between the divider disk and the nib.

32. The writing instrument of claim 30 wherein the capillary storage includes a porous material.

33. The writing instrument of claim 26 wherein a reservoir volume is located on one side of the divider disk and a chamber is located on the other side of the divider disk.

34. The writing instrument of claim 1 further comprising a valve ball.

35. The writing instrument of claim 34 wherein the valve ball is located in the reservoir.

36. The writing instrument of claim 34 further comprising a valve seat, the valve ball engages the valve seat.

37. The writing instrument of claim 34 further comprising a channel, the channel is in fluid communication with the reservoir and the nib.

38. The writing instrument of claim 34 further comprising a valve seat, the valve seat is in fluid communication with the channel.

39. The writing instrument of claim 38 wherein the valve ball engages the valve seat and reduces access to the channel.

40. The writing instrument of claim 1 wherein the body has a front end and a rear end, a push button extends from the rear end and engages the nib assembly.

41. The writing instrument of claim 40 wherein reciprocally moving the nib assembly between the retracted configuration and the extended configuration is accomplished by depressing the push button.

42. The writing instrument of claim 40, wherein the body has formed on an inner surface thereof a plurality of alternating elongated slots and ridges, the elongated slots and ridges arranged in a circumference about the axis.

43. The writing instrument of claim 42, wherein the nib assembly includes a protrusion extending perpendicular to the axis and coextensive with the ridges and slots.

44. The writing instrument of claim 43, further including a spring located between the front end and the nib assembly urging the nib assembly rearward.

45. The writing instrument of claim 43, wherein when in the retracted configuration, the protrusion is urged to the rear of a slot, and when in the extended configuration, the protrusion urges against a cup formed on the front of a ridge.

46. The writing instrument of claim 40 wherein the nib assembly includes an inner barrel, one end of the inner barrel includes a first crown.

47. The writing instrument of claim 46 wherein the first crown has teeth.

48. The writing instrument of claim 46 wherein the push button includes a second crown.

49. The writing instrument of claim 48 wherein the second crown has teeth.

50. The writing instrument of claim 48 wherein the first crown engages the second crown.

51. The writing instrument of claim 40 wherein the push button includes grooves, the body includes ribs, the ribs engage the grooves.

52. The writing instrument of claim 1 wherein the body includes a front barrel and a rear barrel, rotating the front barrel with respect to the rear barrel moves the nib assembly between the extended configuration and the retracted configuration.

53. The writing instrument of claim 1 further comprising an inner barrel disposed in the body.

54. The writing instrument of claim 1 wherein the sliding door includes a puncture, the coupling element includes a prong, the prong engages the puncture.

55. The writing instrument of claim 1 wherein the sliding door has a C-shape.

* * * * *

UNITED STATES PATENT AND TRADEMARK OFFICE
CERTIFICATE OF CORRECTION

PATENT NO. : 6,964,534 B2
APPLICATION NO. : 10/607443
DATED : November 15, 2005
INVENTOR(S) : Brand et al.

It is certified that error appears in the above-identified patent and that said Letters Patent is hereby corrected as shown below:

Column 7, Lines 51, 52, and 56: "ribs 136" should read --ribs 135--.

Column 12, Line 1: "roatatably" should read --rotatably--.

Column 14, Line 11: "852. an" should read --852. An--.

Signed and Sealed this

Eighth Day of April, 2008

JON W. DUDAS
*Director of the United States Patent and Trademark Office*